(12) United States Patent
Ye et al.

(10) Patent No.: US 10,013,477 B2
(45) Date of Patent: Jul. 3, 2018

(54) ACCELERATED DISCRETE DISTRIBUTION CLUSTERING UNDER WASSERSTEIN DISTANCE

(71) Applicant: The Penn State Research Foundation, University Park, PA (US)

(72) Inventors: Jianbo Ye, State College, PA (US); Jia Li, State College, PA (US); James Z. Wang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 15/282,947

(22) Filed: Sep. 30, 2016

(65) Prior Publication Data

US 2017/0083608 A1    Mar. 23, 2017

Related U.S. Application Data

(63) Continuation-in-part of application No. 14/081,525, filed on Nov. 15, 2013, now Pat. No. 9,720,998.

(60) Provisional application No. 61/727,981, filed on Nov. 19, 2012.

(51) Int. Cl.
*G06F 17/30* (2006.01)
*G06N 99/00* (2010.01)

(52) U.S. Cl.
CPC ..... *G06F 17/30598* (2013.01); *G06N 99/005* (2013.01)

(58) Field of Classification Search
CPC ......... G06F 17/30598; G06F 17/30707; G06F 17/3071; G06F 17/30306; G06F 17/3028; G06F 17/30716; G06F 17/30958; G06F 17/30327; G06F 17/30554
See application file for complete search history.

(56) References Cited

U.S. PATENT DOCUMENTS

| | | | |
|---|---|---|---|
| 5,263,120 A * | 11/1993 | Bickel | G06K 9/6218 704/200 |
| 5,832,182 A | 11/1998 | Zhang et al. | |
| 6,374,251 B1 | 4/2002 | Fayyad et al. | |
| 8,285,719 B1 * | 10/2012 | Long | G06F 17/30598 707/737 |
| 8,909,563 B1 | 12/2014 | Jing et al. | |

(Continued)

OTHER PUBLICATIONS

Rabin et. al., Wasserstein Barycenter and its Application to Texture Mixing, Apr. 23, 2010, Hal Archives, pp. 1-16.*

(Continued)

*Primary Examiner* — Ashish K Thomas
*Assistant Examiner* — Rezwanul Mahmood
(74) *Attorney, Agent, or Firm* — Dinsmore & Shohl LLP

(57) ABSTRACT

Computationally efficient accelerated D2-clustering algorithms are disclosed for clustering discrete distributions under the Wasserstein distance with improved scalability. Three first-order methods include subgradient descent method with re-parametrization, alternating direction method of multipliers (ADMM), and a modified version of Bregman ADMM. The effects of the hyper-parameters on robustness, convergence, and speed of optimization are thoroughly examined. A parallel algorithm for the modified Bregman ADMM method is tested in a multi-core environment with adequate scaling efficiency subject to hundreds of CPUs, demonstrating the effectiveness of AD2-clustering.

5 Claims, 22 Drawing Sheets

(56) References Cited

U.S. PATENT DOCUMENTS

| | | | |
|---|---|---|---|
| 9,336,302 B1* | 5/2016 | Swamy | G06F 17/3071 |
| 2004/0117336 A1 | 6/2004 | Basak et al. | |
| 2005/0271276 A1* | 12/2005 | Liang | G06K 9/342 |
| | | | 382/180 |
| 2006/0136462 A1* | 6/2006 | Campos | G06F 17/30539 |
| | | | 707/999.102 |
| 2006/0259480 A1 | 11/2006 | Zhang et al. | |
| 2006/0294101 A1 | 12/2006 | Wnek | |
| 2008/0069400 A1* | 3/2008 | Zhu | G06K 9/3241 |
| | | | 382/103 |
| 2008/0101678 A1* | 5/2008 | Suliga | G06K 9/4671 |
| | | | 382/132 |
| 2009/0055381 A1 | 2/2009 | Wu et al. | |
| 2009/0182594 A1* | 7/2009 | Choubey | G06F 19/327 |
| | | | 705/7.33 |
| 2009/0204637 A1* | 8/2009 | Li | G06F 17/3025 |
| | | | 707/999.107 |
| 2009/0327174 A1 | 12/2009 | Honkala | |
| 2010/0185695 A1* | 7/2010 | Bekkerman | G06F 17/30539 |
| | | | 707/803 |
| 2010/0279892 A1* | 11/2010 | McWeeney | C12Q 1/6886 |
| | | | 506/9 |
| 2010/0281166 A1 | 11/2010 | Buyya et al. | |
| 2011/0142335 A1* | 6/2011 | Ghanem | G06F 17/3025 |
| | | | 382/165 |
| 2011/0295857 A1* | 12/2011 | Aw | G06F 17/2827 |
| | | | 707/739 |
| 2012/0011124 A1 | 1/2012 | Bellegarda | |
| 2012/0088525 A1 | 4/2012 | Kurokawa et al. | |
| 2012/0268612 A1 | 10/2012 | Wang et al. | |
| 2013/0073490 A1* | 3/2013 | Baughman | G06N 3/126 |
| | | | 706/13 |
| 2013/0101221 A1 | 4/2013 | Fujiki et al. | |
| 2013/0151525 A1* | 6/2013 | Ankan | G06F 17/30619 |
| | | | 707/737 |
| 2013/0236075 A1* | 9/2013 | Smith | G06T 7/0014 |
| | | | 382/131 |
| 2013/0262465 A1* | 10/2013 | Galle | G06F 17/30 |
| | | | 707/737 |
| 2013/0325862 A1* | 12/2013 | Black | G06F 17/30598 |
| | | | 707/737 |
| 2014/0006318 A1* | 1/2014 | Xing | G06F 15/16 |
| | | | 706/12 |
| 2014/0143251 A1* | 5/2014 | Wang | G06F 17/30598 |
| | | | 707/737 |
| 2014/0161348 A1* | 6/2014 | Sutherland | G06K 9/6201 |
| | | | 382/162 |
| 2014/0307958 A1* | 10/2014 | Wang | G06K 9/6256 |
| | | | 382/159 |
| 2015/0199960 A1 | 7/2015 | Huo et al. | |
| 2015/0293884 A1* | 10/2015 | Cuturi Cameto | G06F 17/18 |
| | | | 708/201 |
| 2017/0083608 A1* | 3/2017 | Ye | G06F 17/30598 |

OTHER PUBLICATIONS

U.S. Appl. No. 15/282,947, filed Sep. 30, 2016, Jianbo Ye et al.
Julien, C. et al., Image and image-set modeling using a mixture model, *COMPSTAT 2008*, pp. 267-275, 2008.
Kantabutra, S. et al., Parallel K-means clustering algorithm on NOWs, *NECTEC Technical Journal*, 1(6): 243-247, 2000.
Kislyuk, A. et al., Unsupervised statistical clustering of environmental shotgun sequences, *BMC Bioinformatics*, 10(1):316-331, 2009.
Li, J. et al., Real-time computerized annotation of pictures, *IEEE Transactions on Pattern Analysis and Machine Intelligence*, 30(6):985-1002, 2008.
Mallows, C., A note on asymptotic joint normality, *Annals of Mathematical Statistics*, 42(2):508-515, 1972.
Park, G. et al., GPLP: a local and parallel computation toolbox for gaussian process regression, The Journal of Machine Learning Research, 13:775-779, 2012.
Spielman, D. et al., Smoothed analysis of algorithms: Why the simplex algorithm usually takes polynomial time, Journal of the ACM, 51(3):385-463, 2004.
Wan, X., A novel document similarity measure based on earth mover's distance, *Information Sciences*, 177(18):3718-3730, 2007.
Wang, Y., et al., PLDA: Parallel latent Dirichlet allocation for large-scale applications, *In Proc. 5th International Conference on Algorithmic Aspects in Information and Management*, pp. 301-314, 2009.
Xu, D. et al., Video event recognition using kernel methods with multilevel temporal alignment, *IEEE Transactions on Pattern Analysis and Machine Intelligence*, 30(11):1985-1997, 2008.
Zhou, D. et al., A new Mallows distance based metric for comparing clusterings, *In Proc. 22nd International Conference on Machine Learning*, pp. 1028-1035, 2005.

* cited by examiner (b) China (a) Animals (d) Halloween (c) Church

FIGURE 9

| | | | | |
|---|---|---|---|---|
| Flickr concept | animals | winter | trees | mountains |
| Sequential D2 | birds texas dog museum garden | nikon san lake night autumn | family iphone barcelona usa black&white | snow barcelona winter beach river |
| Parallel D2 | animals zoo canon birthday mexico | trees love sunset night church | dog chicago cat portrait model | blue texas mountain snow rock |
| Flickr concept | island | music | dog | city |
| Sequential D2 | scotland mountain rock car blue | river concert night england show | la toronto zoo museum lake | nyc church old sunset canada |
| Parallel D2 | lake uk ocean clouds mountains | band concert dance show black | zoo animals dog cat tour | architecture uk texas city trees |

ACCELERATED DISCRETE DISTRIBUTION CLUSTERING UNDER WASSERSTEIN DISTANCE

REFERENCE TO RELATED APPLICATIONS

This application is a continuation-in-part of U.S. patent application Ser. No. 14/081,525, filed Nov. 15, 2013, which claims priority from U.S. Provisional Patent Application Ser. No. 61/727,981, filed Nov. 19, 2012, the entire content of both of which is incorporated herein by reference.

STATEMENT OF GOVERNMENT SUPPORT

This invention was made with government support under Grant Nos. OCI1027854, IIS0347148, CCF0936948, and OCI0821527, awarded by the National Science Foundation. The government has certain rights in the invention.

FIELD OF THE INVENTION

This invention relates to data clustering and, in particular, to accelerated discrete distribution (D2) clustering based on Wasserstein distance.

BACKGROUND OF THE INVENTION

Clustering is a fundamental unsupervised learning methodology for data mining and machine learning. Additionally, clustering can be used in supervised learning for building non-parametric models (Beecks et al., 2011). The K-means algorithm (MacQueen, 1967) is one of the most widely used clustering algorithms because of its simple yet generally accepted objective function for optimization. Though several variants of K-means have evolved recently, a fundamental limitation of K-means and those variants is that they only apply to the Euclidean space.

In many emerging applications, however, the data to be processed are not vectors. In particular, bags of weighted vectors (e.g., bags of words, bags of visual words, sparsely represented histograms), which can be formulated as discrete distributions with finite but arbitrary supports, are often used as object descriptors (Chen and Wang, 2004; Pond et al., 2010). The discrete distribution clustering algorithm, also known as the D2-clustering (Li and Wang, 2008), tackles such type of data by optimizing an objective function defined in the same spirit as that used by K-means. Specifically, it minimizes the sum of squared distances between each object and its nearest centroid. D2-clustering is implemented and applied in a real-time image annotation system named ALIPR (Li and Wang, 2008).

There are several ways to measure the closeness between two discrete distributions, such as Kullback-Leibler divergence (Cover and Thomas, 2012) and $L_1$ distance (Batu et al., 2013). Most metrics simply treat discrete distributions as regular histograms (after quantization if necessary) and measure their differences only by comparing the aligned bins among histograms. When the supports of discrete distributions are at arbitrary locations and of variable sizes, these metrics cannot effectively measure the distance because the supports of two distributions may not be aligned. In such situations, which are prevalent in applications using the bag-of-word representation, the transportation metric is useful because it measures the similarity by solving an optimal matching problem known as the transportation problem. The problem was initially formulated by French mathematician Monge (1781) and later by Russian mathematician Kantorovich (1942). The metric is known as the Kantorovich-Wasserstein metric. It also has several variants, as well as names, in part due to its wide application in different fields. Readers can refer to the book by Rachev and Ruschendorf (1998) for some of these applications. For example, the metric is better known as the earth mover's distance (EMD) (Rubner et al., 1998) in computer vision and the Mallows distance in statistics literature (Mallows, 1972). To simplify the discussion, hereafter we refer to the Kantorovich-Wasserstein metric as the Wasserstein distance.

The Wasserstein distance is robust to quantization noise and efficient with sparse representations. It is proved to be an effective metric for image retrieval and annotation. The D2-clustering algorithm is constructed based upon this distance and has been applied successfully to image annotation. In addition, this distance is also adopted in multiple data mining and machine learning applications such as video classification and retrieval (Xu and Chang, 2008), sequence categorization (Pond et al., 2010), and document retrieval (Wan, 2007), where objects are represented by discrete distributions. As a fundamental machine learning tool to group discrete distributions with Wasserstein distance, D2-clustering can be highly valuable in these areas.

A major concern in applying D2-clustering is its scalability. Because linear programming is needed in D2-clustering and the number of unknown variables grows with the number of objects in a cluster, the computational cost would normally increase polynomially with the sample size (assuming the number of clusters is roughly fixed). As a result, on a typical 2 GHz single-core CPU, ALIPR takes several minutes to learn each semantic category by performing D2-clustering on 80 images in it, but demands more than a day to complete the modeling of a semantic category containing thousands of training images. There are some alternative ways (Julien and Saitta, 2008; Yavlinsky et al., 2005) to perform the clustering faster, but they generally perform some indirect or sub-optimal clustering and hence lack the optimization properties of the D2-clustering.

The clustering problems researchers tackle today are often of very large scale. For instance, we are seeking to perform learning and retrieval on images from the Web containing millions of pictures annotated by one common word. This leads to demanding clustering tasks even if we perform learning only on a tiny fraction of the Web. Adopting bags of weighted vectors as descriptors, we can encounter the same issue in other applications such as video, biological sequence, and text clustering, where the amount of data can be enormous. In such cases, D2-clustering is computationally impractical.

Given the application potential of D2-clustering and its theoretical optimization advantages, it is of great interest to develop a variant of the algorithm with a substantially lower computational complexity, especially under a parallel computing environment. With the increasing popularity of large-scale cloud computing in real-world information systems, we are well motivated to exploit parallel computing.

K-Means Clustering

K-means is one of the most widely applied clustering algorithms on vectors. Given a set of N vectors $\vec{v}_1, \vec{v}_2, \ldots, \vec{v}_N$, K-means groups them into k clusters with centroids $\vec{z}_1, \vec{z}_2, \ldots, \vec{z}_k$. Each vector v is assigned with a clustering label $C(i)=j$, $j \in \{1, 2, \ldots, k\}$ if $v_i$ belongs to the j-th cluster. The objective of K-means clustering is to minimize the total within-cluster dispersion $$\varepsilon = \sum_{j=1}^{k} \sum_{i: C(i)=j} \|\vec{v}_i - \vec{z}_j\|^2. \tag{1}$$

Both the labeling $C(\cdot)$ and the centroids $\vec{z}_j$'s are involved in the optimization. Because they interlace with each other in the optimization, they are iteratively updated in two stages. Within each iteration, $C(i)$ is updated by assigning each $\vec{v}_i$ with the label of its closest cluster centroid and then the centroid $\vec{z}_j$ for each cluster is updated by averaging the vectors attached to the cluster. For each of the two stages the updating decreases the objective in Eq. (1) monotonically. The iteration terminates when the objective stabilizes below a certain value, as defined in the stopping criteria.

Discrete Distributions and Wasserstein Distance

A discrete distribution gives the probability masses of a random variable at values within a finite set of range. It can be formulated by a bag of value-probability tuples at all possible values of the random variable. For instance, if a random variable v takes value at $v^{(1)}, v^{(2)}, \ldots, v^{(t)}$ with probability $p_v^{(1)}, p_v^{(2)} \ldots p_v^{(t)}$ ($\sum_{\alpha=1}^{t} p_v^{(\alpha)} = 1$), the discrete distribution is written as $$v = \{(v^{(1)}, p_v^{(1)}), \ldots, (v^{(t)}, p_v^{(t)})\}.$$

Given another discrete distribution $u = \{(u^{(1)}, p_u^{(1)}), (u^{(1)}, p_u^{(1)}), \ldots, (u^{(t')}, p_u^{(t')})\}$, the Wasserstein distance $D(v, u)$ between v and u is solved by the following linear program:

$$D(u, v) = \left(\min_{\omega_{\alpha,\beta}} \sum_{\alpha=1}^{t} \sum_{\beta=1}^{t'} \omega_{\alpha,\beta} d^2(v^{(\alpha)}, u^{(\beta)})\right)^{\frac{1}{2}}, \quad (2)$$

subject to:

$$\sum_{\alpha=1}^{t} \omega_{\alpha,\beta} = p_u^{(\beta)}, \forall \beta = 1, \ldots, t',$$

$$\sum_{\beta=1}^{t'} \omega_{\alpha,\beta} = p_v^{(\alpha)}, \forall \alpha = 1, \ldots, t,$$

$$\omega_{\alpha,\beta} \geq 0, \forall \alpha = 1, \ldots, t, \forall \beta = 1, \ldots, t'.$$

In Eq. (2), $\omega_{\alpha,\beta}$ is the matching weights between the $\alpha$-th element in v and $\beta$-th element in u. We denote $d(v^{(\alpha)}, u^{(\beta)})$ as the distance between $v^{(\alpha)}$ and $u^{(\beta)}$ in the sample space of the random variable. If the sample space is a Euclidean space, $L^2$ norm is normally adopted as the measure, i.e., $d(v^{(\alpha)}, u^{(\beta)}) = \|v^{(\alpha)} - u^{(\beta)}\|$. Hereafter we assume that the random variable of a discrete distribution is sampled from an Euclidean space unless otherwise noted. In fact, the metric used by the sample space is not essential for the Wasserstein distance because what make the computation elaborate are the matching weights solved in the linear programming.

D2-Clustering

D2-clustering is a clustering algorithm for any collection of discrete distributions within the same sample space. Working in the same spirit as K-means, it also aims at minimizing the total within-cluster dispersion. Because the distances between discrete distributions are calculated using Wasserstein distance, the objective function to be minimized is the total squared Wasserstein distance between the data and the centroids.

Suppose there are N discrete distributions and k centroids, we denote the discrete distributions as the objective is then formulated as $$v_i = \{(v_i^{(1)}, p_{v_i}^{(1)}), \ldots, (v_i^{(t_i)}, p_{v_i}^{(t_i)})\}, i=1, 2, \ldots, N, \text{ and centroids as}$$

$$z_j = \{(z_j^{(1)}, p_{z_j}^{(1)}), \ldots, (z_j^{(s_j)}, p_{z_j}^{(s_j)})\}, j=1, \ldots, k, \text{ the objective is then formulated as}$$

$$\varepsilon = \sum_{j=1}^{k} \sum_{i:C(i)=j} D^2(z_j, v_i)$$

Although this optimization criterion is used by K-means, the computation in D2-clustering is much more sophisticated due to the nature of the Wasserstein distance, which is chosen because of its advantageous properties. The D2-clustering algorithm is analogous to K-means in that it iterates the update of the partition and the update of the centroids. There are two stages within each iteration. First, the cluster label of each sample is assigned to be the label of its closest centroid; and second, centroids are updated by minimizing the within-cluster sum of squared distances. To update the partition in D2-clustering, we need to compute the Wasserstein distance between a sample and each centroid. To update the centroids, an embedded iterative procedure is needed which involves a large-scale linear programming problem in every iteration. The number of unknowns in the optimization grows with the number of samples in the cluster.

To update a certain centroid $z_j$ for a cluster of discrete distributions $v_1, v_2, \ldots, v_{n_j}$ attached to it, the following optimization is pursued.

$$\min_{z_j} \sum_{i}^{n_j} D^2(z_j, v_i) \quad (3)$$

where $$z_j = \{(z_j^{(1)}, p_{z_j}^{(1)}), \ldots, (z_j^{(s_j)}, p_{z_j}^{(s_j)})\},$$

$$v_i = \{(v_i^{(1)}, p_{v_i}^{(1)}), \ldots, (v_i^{(t_i)}, p_{v_i}^{(t_i)})\},$$

$$D^2(z_j, v_i) = \min \omega_{\alpha,\beta}^{(i)} \sum_{\alpha=1}^{s_j} \sum_{\beta=1}^{t_i} \|z_j^{(\alpha)} - v_i^{(\beta)}\|^2$$

subject to:

$$p_z^{(\alpha)} \geq 0, \alpha=1, \ldots, s_j, \sum_{\alpha=1}^{s_j} p_{z_j}^{(\alpha)} = 1,$$

$$\sum_{\beta=1}^{t_i} \omega_{\alpha,\beta}^{(i)} = p_{z_j}^{(\alpha)}, i=1, \ldots, n_j, \alpha=1, \ldots, s_j,$$

$$\sum_{r=1}^{s_j} \omega_{\alpha,\beta}^{(i)} = p_{v_i}^{(\beta)}, i=1, \ldots, n_j, \beta=1, \ldots, t_i, \alpha=1, \ldots, s_j,$$

$$\omega_{\alpha,\beta}^{(i)} > 0, i=1, \ldots, n_j, \alpha=1, \ldots, s_j, \beta=1, \ldots, t_i.$$

Because $z_j$ is not fixed in Eq. (3), we cannot separately optimize the Wasserstein distances $(z_j, v_i), i=1, \ldots, n_j$, because $z_j$ is involved and the variables $\omega_{\alpha,\beta}^{(i)}$ for different $i$'s affect each other through $z_j$. To solve the complex optimization problem, the D2-clustering algorithm adopts an iterative process as shown in Algorithm 1.

---

ALGORITRM 1: Centroid Update Process of D2-Clustering

Input: A collection of discrete distributions $v_1, v_2, \ldots, v_{n_j}$ that belong to cluster j.
Output: The centroid $z_j$ of the input discrete distributions in terms of Mallows distance.
begin
   while objective $\varepsilon_j$ (defined in (3)) does not reach convergence do
      Fix $z_j^{(\alpha)}$'s update $p_{z_j}^{(\alpha)}$'s and $w_{\alpha,\beta}^{(i)}$'s in (3). In this case the optimization reduces to a linear programming.
      Fix $p_{z_j}^{(\alpha)}$'s and update $z_j^{(\alpha)}$, $\alpha = 1, \ldots, s_j$. In this case the solution of $z_j^{(\alpha)}$'s to optimize (3) are simply weighted averages:

$$z_j^{(\alpha)} = \frac{\sum_{i=1}^{n_j} \sum_{\beta=1}^{t_i} w_{\alpha,\beta}^{(i)} v_i^{(\beta)}}{\sum_{i=1}^{n_j} \sum_{\beta=1}^{t_i} w_{\alpha,\beta}^{(i)}}, \alpha = 1, \ldots, s_j.$$

Calculate the objective function $\varepsilon_j$ in (3) using the updated $z_j^{(\alpha)}$'s, $p_{z_j}^{(\alpha)}$'s, and $w_{\alpha,\beta}^{(i)}$'s.
   end
end Inside the "while" loop of Algorithm 1, the linear programming in line 1 is the primary cost in the centroid update process. It solves $p_{z_j}^{(\alpha)}$, $\omega_{\alpha,\beta}^{(i)}$, $\alpha=1, \ldots, s_j$, $i=1, \ldots, n_j$, $\beta=1, \ldots, t_i$, a total of $s_j+s_j\Sigma_{i=1}^{n_j}t_i \approx n_j s_j^2$ parameters when s; is set to be the average of the $t_i$'s. The number of constraints is $1+n_j s_j + \Sigma_1^{n_j} t_i \approx 2n_j s_j$. Hence, the number of parameters in the linear program grows linearly with the size of the cluster. Because it costs polynomial time to solve the linear programming problem (Spielman and Teng, 2004), D2-clustering has a much higher computational complexity than K-means algorithm.

The analysis of the time complexity of K-means remains an unsolved problem because the number of iterations for convergence is difficult to determine. Theoretically, the worst case time complexity for K-means is $\Omega(2^{\sqrt{m}})$ (Arthur and Vassilvitskii, 2006). Arthur et al. (2011) show recently that K-means has polynomial smoothed complexity, which reflects the fact that K-means converges in a relatively short time in real cases (although no tight upper or lower bound of time complexity has been proved). In practice, K-means usually converges fast, and seldom costs an exponential number of iterations. In many cases K-means converges in linear or even sub-linear time (Duda et al., 2012). Kumar et al. (2010) present a random sampling and estimation approach to guarantee K-means to compete in linear time. Although there is still a gap between the theoretical explanation and practice, we can consider K-means an algorithm with at most polynomial time.

Although the D2-clustering algorithm interlaces the update of clustering labels and centroids in the same manner as K-means, the update of centroids is much more complicated. As described above, to update each centroid involves an iterative procedure where a large-scale linear programming problem detailed in (3) has to be solved in every round. This makes D2-clustering polynomially more complex than K-means in general.

The discrete distribution, or discrete probability measure, is a well-adopted way to summarize a mass of data. It often serves as a descriptor for complex instances encountered in machine learning, e.g., images, sequences, and documents, where each instance itself is converted to a data collection instead of a vector. In a variety of research areas including multimedia retrieval and document analysis, the celebrated bag of "words" data model is intrinsically a discrete distribution. The widely used normalized histogram is a special case of discrete distributions with a fixed set of support points across the instances. In many applications involving moderate or high dimensions, the number of bins in the histograms is enormous because of the diversity across instances, while the histogram for any individual instance is highly sparse. This is frequently observed for collections of images and text documents.

The discrete distribution can function as a sparse representation for the histogram, where support points and their probabilities are specified in pairs, eliminating the restriction of a fixed quantization codebook across instances.

The Wasserstein distance is a true metric for measures and can be traced back to the mass transport problem proposed by Monge in 1780s and the relaxed formulation by Kantorovich in the 1940s. Mallows used this distance to prove some theoretical results in statistics, and thus the name Mallows distance has been used by statisticians. In computer science, it is better known as the Earth Mover's Distance. In signal processing, it is closely related to the Optimal Sub-Pattern Assignment (OSPA) distance used recently for multi-target tracking. The Wasserstein distance is computationally costly because the calculation of the distance has no closed form solution and its worst time complexity is at least $O(n^3 \log n)$ subject to the number of support points in the distribution.

Clustering Distributions:

Distribution clustering can be done subject to different affinity definitions. For example, Bregman clustering pursues the minimal distortion between the cluster prototype—called the Bregman representative—and cluster members according to a certain Bregman divergence (Banerjee et al. 2005). In comparison, D2-clustering is an extension of K-means to discrete distributions under the Wasserstein distance (Li and Wang 2008), and the cluster prototype is an approximate Wasserstein barycenter with sparse support. In the D2-clustering framework, solving the cluster prototype or the centroid for discrete distributions under the Wasserstein distance is computationally challenging (Cuturi and Doucet 2014; Ye and Li 2014; Zhang, Wang, and Li 2015). In order to scale up the computation of D2-clustering, a divide-and-conquer approach has been proposed (Zhang, Wang, and Li 2015), but the method is ad-hoc from optimization perspective. A standard ADMM approach has also been explored (Ye and Li 2014), but its efficiency is still inadequate for large datasets. Although fast computation of Wasserstein distances has been much explored (Pele and Werman 2009; Cuturi 2013; H. Wang and Banerjee 2014), how to perform top-down clustering efficiently based on the distance has not. We present below the related work and discuss their relationships with our current work.

The True Discrete Wasserstein Barycenter and Two Approximation Strategies:

The centroid of a collection of distributions minimizing the average pth-order power of the $L_p$ Wasserstein distance is called Wasserstein barycenter (Agueh and Carlier 2011). In the D2-clustering algorithm (Li and Wang 2008), the 2nd order Wasserstein barycenter is simply referred to as a prototype or centroid; and is solved for the case of an unknown support with a pre-given cardinality. The existence, uniqueness, regularity and other properties of the 2nd order Wasserstein barycenter have been established mathematically for continuous measures in the Euclidean space (Agueh and Carlier 2011). But the situation is more intricate for discrete distributions, as will be explained later.

Given N arbitrary discrete distributions each with $\overline{m}$ support points, their true Wasserstein barycenter in theory can be solved via linear programming (Agueh and Carlier 2011; Anderes, Borgwardt, and Miller 2015). This is because the support points of the Wasserstein barycenter can only locate at a finite (yet huge) number of possible positions. However, solving the true discrete barycenter quickly becomes intractable even for a rather small number of distributions containing only 10 support points each. An important theoretical progress has been made by Anderes et al. (Anderes, Borgwardt, and Miller 2015) who proved that the actual support of a true barycenter of N such distributions is extremely sparse, with cardinality m no greater than $\overline{m}N$. However, the complexity of the problem is not reduced practically because so far there is no theoretically ensured way to sift out the optimal sparse locations. On the other hand, the new theory seems to backup the practice of assuming a pre-selected number of support points in a barycenter as an approximation to the true solution.

To achieve good approximation, there are two computational strategies one can adopt in an optimization framework:

1. Carefully select beforehand a large and representative set of support points as an approximation to the support of the true barycenter (e.g. by K-means).

2. Allow the support points in a barycenter to adjust positions at every τ iterations.

The first strategy of fixing the support of a barycenter can yield adequate approximation quality in low dimensions (e.g. 1D/2D histogram data) (Cuturi and Doucet 2014; Benamou et al. 2015), but can face the challenge of exponentially growing support size when the dimension increases. The second strategy allows one to use a possibly much smaller number of support points in a barycenter to achieve the same level of accuracy (Li and Wang 2008; Zhang, Wang, and Li 2015; Ye and Li 2014; Cuturi and Doucet 2014). Because the time complexity per iteration of existing iterative methods is $O(\bar{m}mN)$, a smaller m can also save substantial computational time so as to trade in with the extra amount of time $O(\bar{m}mdN/\tau)$ to recalculate the distance matrices. In the extreme case when the barycenter support size is set to one (m=1), D2-clustering reduces to K-means on the distribution means, which is a meaningful way of data reduction in its own right. Our experiments indicate that in practice a large m in D2-clustering is usually unnecessary.

In applications on high-dimensional data, it is desirable to optimize the support points rather than fix them from the beginning. This however leads to a non-convex optimization problem. Our work aims at developing practical numerical methods. In particular, the method optimizes jointly the locations and weights of the support points in a single loop without resorting to a bi-level optimization reformulation, as was done in earlier work (Li and Wang 2008; Cuturi and Doucet 2014).

Solving Discrete Wasserstein Barycenter in Different Data Settings:

Recently, a series of works have been devoted to solving the Wasserstein barycenter given a set of distributions (e.g. (Carlier, Obennan, and Oudet 2014; Cuturi and Doucet 2014; Benamou et al. 2015; Ye and Li 2014; Cuturi, Peyre, and Rolet 2015)). How our method compares with the existing ones depends strongly on the specific data setting. We discuss the comparisons in details below and motivate the use of our new method in D2-clustering.

In (Benamou et al. 2015; Cuturi and Doucet 2014; Cuturi 2013), novel algorithms have been developed for solving the Wasserstein barycenter by adding an entropy regularization term on the optimal transport matching weights. The regularization is imposed on the transport weights, but not the barycenter distribution. In particular, iterative Bregman projection (IBP) (Benamou et al. 2015) can solve an approximation to the Wasserstein barycenter. IBP is highly memory efficient for distributions with a shared support set (e.g. histogram data), with a memory complexity $O((m+\bar{m})N)$. In comparison, our modified B-ADMM approach is of the same time complexity, but requires $O(\bar{m}mN)$ memory. If N is large, memory constraints can limit our approach to problems with relatively small m or $\bar{m}$. Consequently, the second approximation strategy is crucial for reaching high accuracy by our approach, while the first strategy may not meet the memory constraint. In the conventional OT literature, the emphasis is on computing the Wasserstein barycenter for a small number of instances with dense representations (e.g. Solomon et al. 2015; Rabin et al. 2011); and IBP is more suitable. But in many machine learning and signal processing applications, each instance is represented by a discrete distribution with a sparse support set (aka, $\bar{m}$ is small). The memory limitation of B-ADMM can be avoided via parallelization until the time budget is spent. Our focus is thus to achieve scalability in N. B-ADMM has important advantages over IBP that motivate the usage of the former in practice.

First of all, it is interesting to note that if the distributions do not share the support set, IBP (Benamou et al. 2015) has the same memory complexity $O(\bar{m}mN)$ (for caching the distance matrix per instance) as our approach. In addition, B-ADMM (H. Wang and Banerjee 2014), based on which our approach is developed, has the following advantages: (1) It yields the exact OT and distance in the limit of iterations. Note that the ADMM parameter does not trade off the convergence rate. (2) It exhibits different convergence behaviors, accommodating warm starts and early stops (to be illustrated later), valuable traits for the task of D2-clustering. (3) It works well with single-precision floats, thus not pestered by the machine precision constraint. In contrast, this issue is serious for IBP, preventing it from robustly outputting adequately accurate discrete Wasserstein barycenters with sparse support (See Benamou et al. 2015) and our experiments). Here the "adequately accurate" means close to a local minimizer of sum of the (squared) Wasserstein distances.

Optimization Methods Revisited:

Our main algorithm disclosed herein is inspired by the B-ADMM algorithm of Wang and Banerjee (H. Wang and Banerjee 2014) for solving OT fast. They developed the two-block version of ADMM (Boyd et al. 2011) along with Bregman divergence to solve the OT problem when the number of support points is extremely large. Its algorithmic relation to IBP (Benamou et al. 2015) is discussed herein. The OT problem at a moderate scale can in fact be efficiently handled by state-of-the-art LP solvers (Tang et al. 2013). As demonstrated by the line of work on solving the barycenter, optimizing the Wasserstein barycenter is rather different from computing the distance. Naively adapting the B-ADMM to Wasserstein barycenter does not result in a proper algorithm.

SUMMARY OF THE INVENTION

This invention resides in computationally efficient algorithms for clustering discrete distributions under the Wasserstein distance. We adopt the well-accepted criterion of minimizing the total within-cluster variation under the Wasserstein distance, similarly as K-means for vectors under the Euclidean distance. This clustering problem was originally explored by Li and Wang, who coined the phrase D2-clustering in 2006, referring to both the optimization problem and their particular algorithm. Motivations for using the Wasserstein distance in practice are strongly argued by researchers and its theoretical significance by the optimal transport literature (see the seminal books of Villani).

We have developed and compared three first-order methods for optimizing the Wasserstein centroids in D2-clustering: subgradient descent method with re-parametrization, alternating direction method of multipliers (ADMM), and a modified version of Bregman ADMM. We refer to the modified Bregman ADMM as the main algorithm. The effects of the hyper-parameters on robustness, convergence, and speed of optimization are thoroughly examined.

The new methods, collectively called AD2-clustering (Accelerated D2-clustering), improve scalability significantly. We have also developed a parallel algorithm for the modified Bregman ADMM method in a multi-core environment with adequate scaling efficiency subject to hundreds of CPUs. Finally, we tested our new algorithm on several large-scale real-world datasets, revealing the high competitiveness of AD2-clustering.

BRIEF DESCRIPTION OF THE DRAWINGS

FIG. 9 shows examples of concept prediction using the models built by the sequential and parallel D2-clustering results;

FIGS. 11A-1H show the convergence analysis results on the four datasets;

FIGS. 12A-2D shows a comparison of the convergence performance of the overall clustering process employing Bregman ADMM at $\rho_0=2.0$ and the subgradient descent method; and FIGS. 13A-3B show the comparison between Kmeans++ and AD2-clustering on USPS dataset.

DETAILED DESCRIPTION OF THE INVENTION

Figure 1:
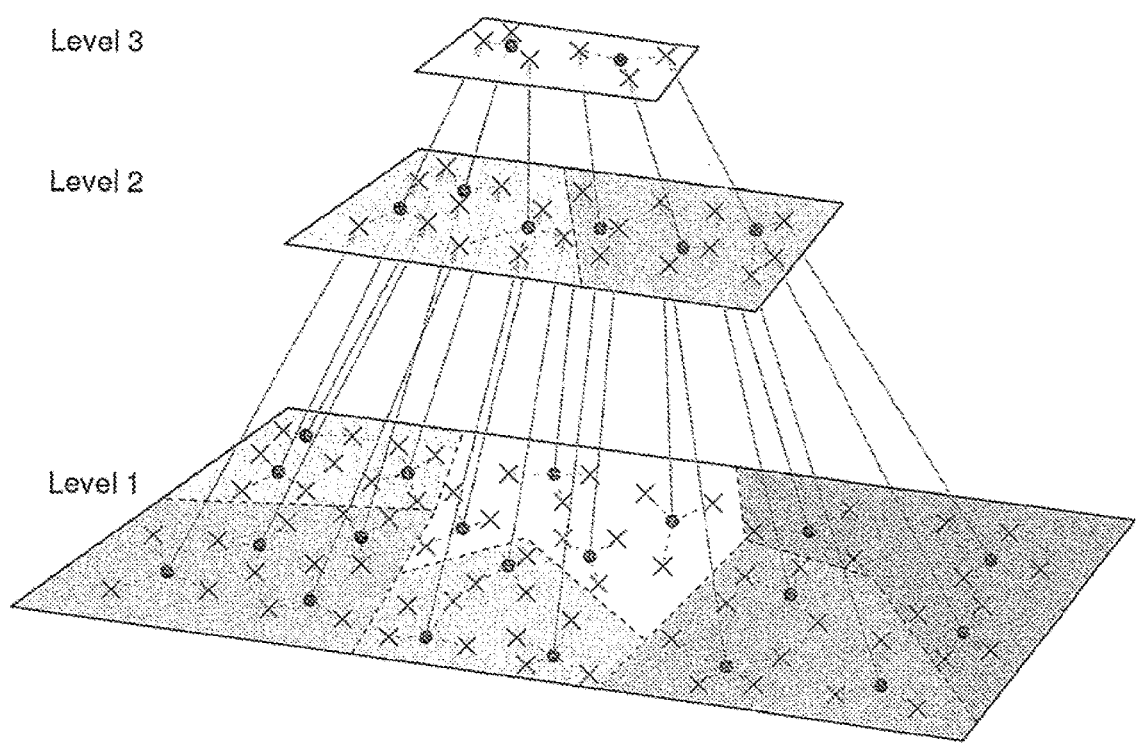
FIG. 1 illustrates the hierarchical structure used for parallel processing, wherein input data are denoted by crossings at the bottom level (Level 1)

Table I compares D2-clustering with several basic clustering algorithms in machine learning. D2-clustering runs on discrete distributions which K-means cannot handle. It is also more preferable over agglomerative clustering (Johnson, 1967) and spectral clustering (Ng et al., 2002) when cluster prototypes are needed. The main disadvantage of D2-clustering is the high time complexity. The parallel D2-clustering algorithm listed on the last column of the table keeps most of D2-clustering's properties with minor approximation, and improves the time complexity to a much lower order.

TABLE I

Comparison of Basic Clustering Approaches

| Method | K-means Clustering | Agglomerative Clustering | Spectral Clustering | D2-Clustering | Parallel D2-Clustering |
|---|---|---|---|---|---|
| Data type | Vectors | Any type | Any type | Discrete distributions | Discrete distributions |
| Provide prototypes | Yes | No | No | Yes | Yes |
| Based on pair-wise distances | No | Yes | Yes | No | No |
| Global Optimization | Yes | No | No | Yes | Yes, with approximation |
| Time Complexity | Linear | Quadratic | Cubic | Polynomial | Linearithmic |

Notations

This disclosure inherits the notations used above. Discrete distributions are in bold font. $v_i$'s with index i denote the discrete distributions to be clustered, and $z_j$'s with index j are the labeling assignment function, where $C(i)=j$ means data point $x_i$ belongs to the cluster with centroid $z_j$.

To reduce the computational complexity of D2-clustering, we apply the divide-and-conquer strategy in our new parallel algorithm. Divide-and-conquer is a general strategy for algorithm acceleration in many applications. And Parallelization is one of the most well adopted technique to implement the divide-and-conquer structure. There are several recent parallel algorithms (Chang et al., 2009; Wang et al., 2009; Tamada et al., 2011; Park et al., 2012) that attempt to reduce the overall processing time for large-scale data by distributing parallel processes to different computation units. Particularly for K-means, within each iteration both the labeling and centroid update stages can be naturally parallelized (Dhillon and Modha, 2000; Kantabutra and Couch, 2000). The parallelization of D2-clustering, however, is not straightforward because the centroid update optimization is not losslessly separable, though the cluster label of each point can still be optimized separately.

The centroid update for both K-means and D2-clustering is to find an optimized centroid for each cluster with the objective that the sum of squared distances from the centroid to each data point in the cluster is minimal. For K-means, the optimized centroid for each cluster is simply the arithmetic mean of the data points in it, which can be obtained by averaging the separately computed local means of different data chunks. For D2-clustering, a linear program described by (3) has to be solved to get the optimized centroid. Unlike K-means' centroid update, which is essentially a step of computing an average, the computation of a centroid in D2-clustering is far more complicated than any linear combination of the data points. Instead, all the data points in the corresponding cluster play a role in the linear programming problem in Eq. (3). To the best of our knowledge, there is no mathematical equivalence of a parallel algorithm for the problem.

With some approximation, we devise a novel approach to parallelize the centroid update in D2-clustering by a similar strategy to K-means' parallelization: dividing the data into segments based on their adjacency, computing some local centroids for each segment in parallel, and combining the local centroids to a global centroid.

Heuristically we can get a close estimation of the optimal centroid in this way, considering that the notion of centroid is exactly for a compact representation of a group of data. Hence, a centroid computed from the local centroids should represent well the entire cluster, although some loss of accuracy is expected.

Both the dividing of data and combining of local centroids involve linear programmings and are hence not simple. We adopt a reduced version of D2-clustering to perform the data segmentation efficiently, and propose a hierarchical structure to keep the combination operation from becoming a large-scale linear programming.

Particularly for implementation, parallel computing techniques, such as Message Passing Interface (MPI) (Thakur et al., 2005) and MapReduce (Dean and Ghemawat, 2008) can be applied. In the current work, MPI is used to implement the parallel algorithm. The algorithm can also be implemented by other frameworks (e.g., MapReduce and Hadoop) if desired.

Parallel D2-Clustering Algorithm

In this section, we present the parallel D2-clustering algorithm. Hereafter, we refer to the original D2-clustering as the sequential algorithm. We will describe the hierarchical structure for speeding up D2-clustering and a weighted version of D2-clustering which is needed in the parallel algorithm but not in the sequential algorithm. We will also describe in detail the coordination among the individual computation nodes (commonly called the slave processors) and the node that is responsible for integrating the results (called the master processor). Finally, we analyze the convergence property and the computational complexity of the parallel algorithm. The D2-Clustering software packages for both single core and parallel processing, developed with the C programming language, are provided for readers to download and use in their own applications.

Algorithm Structure

To avoid the large linear programming problem in Eq. (3) when performing D2-clustering, we divide the large dataset into segments and perform local D2-clustering on each of them in parallel. These local clusters are then combined to achieve a global clustering result. Because the local cluster centroids are also discrete distributions, combining these local centroids also involves a linear programming. To achieve a low overall run-time, we want to keep both the local clustering tasks and the combination of local results at a small scale, which cannot be achieved simultaneously when the size of the overall data is large. As a result, we propose a hierarchical structure to conduct parallel computing recursively through multiple levels. This way, we can control the scale of linear programming in every segment and at every level.

FIG. 1 illustrates the hierarchical structure used for parallel processing. All input data are denoted by crosses at the bottom level (Level 1) in FIG. 1. Because of the large data size, these data points (each being a discrete distribution) are divided into several segments (reflected by different shadings in the figure) which are small enough to be clustered by the sequential D2-clustering. D2-clustering is performed within each segment. Data points in each segment are assigned with different cluster labels, and several cluster centroids (denoted by blue dots in the figure) are obtained. These cluster centroids are regarded as proper summarization for the original data. Each centroid approximates the effect of the data assigned to the corresponding cluster, and is taken to the next level in the hierarchy. At the new level they are treated as data themselves and being further clustered by the same way data are clustered at the previous level. The data size in the new level can still be large, although it should be much smaller than the original data size. Therefore, the algorithm may proceed to higher levels by repeating the same process, with the number of segments decreasing level by level. The granularity of the data becomes coarser and coarser as the algorithm traverses through the levels of the hierarchy.

The hierarchy terminates when the amount of data at a certain level is sufficiently small and no further clustering is needed. In FIG. 1 the data size at the third level is small enough for not proceeding to another level. The clusters at the highest level is then the final clustering result.

In short, at each level, except the bottom level, we perform D2-clustering on the centroids acquired from the previous level. Borrowing the terminology of a tree graph, we can call a centroid a parent point and the data points assigned to its corresponding cluster child points. The cluster labels of the centroids at a higher level are inherited by their child points, and propagate further to all the descendent points. To help visualize the tree, in FIG. 1, data points in one cluster at a certain level are connected to the corresponding centroid using dashed lines. And the red arrows between levels indicate the correspondence between a centroid and a data point at the next level. To determine the final clustering result for the original data, we only need to trace each data point through the tree and find the cluster label of its ancestor at the top level.

In such a hierarchical structure, the number of centroids becomes smaller and smaller as the level increases. Therefore, it is guaranteed that the hierarchy can terminate. In addition, because D2-clustering is conducted within small segments, the overall clustering can be completed quickly.

Initial Data Segmentation

We now describe the initial data segmentation method. In this step, we want to partition the dataset into groups all smaller than a certain size. The partitioning process is in a similar spirit as the initialization step of the LBG algorithm proposed by Linde et al. (1980), an early instance of K-means in signal processing. The whole dataset is iteratively split into partitions until a stopping criterion is satisfied. And within each iteration, the splitting is an approximation of, and computationally less expensive than, an optimal clustering.

Figure 2:
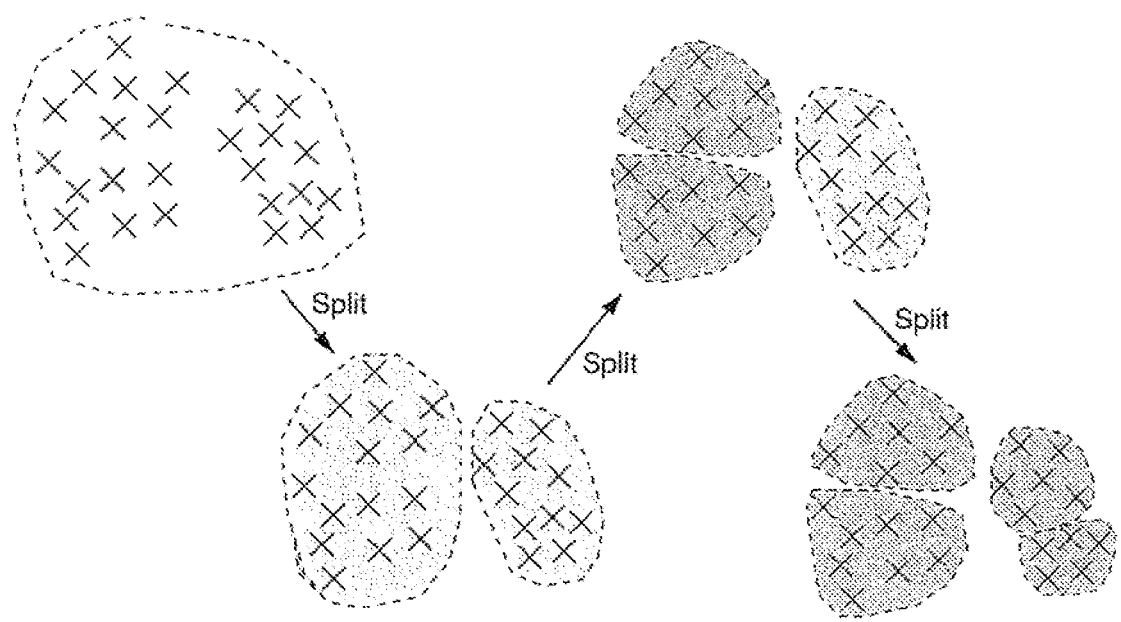
FIG. 2 illustrates an iterative process containing a series of binary splitting.

FIG. 2 illustrates the iterative process containing a series of binary splitting. Different from the initialization of the LBG algorithm, which splits every segment into two parts, doubling the total number of segments in every iteration, our approach only splits one segment in each round. The original data are split into two groups using a binary clustering approach (to be introduced later). Then we further split the segments by the same process repetitively. Each time we split the segment containing the most data points into two clusters, so on so forth. The splitting process stops when all the segments are smaller than a certain size.

As shown in FIG. 2, within each round of dividing a group of data into two segments, we aim at optimal clustering so that data points in each segment are close. On the other hand, this clustering step needs to be fast because it is a preparation before conducting D2-clustering in parallel. The method we use is a computationally reduced version of D2-clustering. It is suitable for clustering bags of weighted vectors. Additionally, it is fast because of some constraints imposed on the centroids. We refer to this version as the constrained D2-clustering.

The constrained D2-clustering is a reduced version of D2-clustering. We denote each data point to be clustered as $v_i = \{(v_i^{(1)}, p_{v_i}^{(1)}), \ldots, (v_i^{(t_i)}, p_{v_i}^{(t_i)})\}$, $i = 1, \ldots, n$, and k initial centroids as $z_j = \{(z_j^{(1)}, p_{z_j}^{(1)}), \ldots, (z_j^{(s_j)}, p_{z_j}^{(s_j)})\}$, $j = 1, \ldots, k$. Parameters $t_i$ and $s_j$ are the numbers of support vectors in the corresponding discrete distributions $v_i$ and $z_j$. And $C(i) \in \{1, \ldots, k\}$ denotes the cluster label assigned to $v_i$. The D2-clustering and constrained D2-clustering algorithms are described in Algorithm 2.

Weighted D2-Clustering

Data segments generated by the initialization step are distributed to different processors in the parallel algorithm. Within each processor, a D2-clustering is performed to cluster the segment of data. Such a process is done at different levels as illustrated in FIG. 1.

Clustering at a certain level usually produces unbalanced clusters containing possibly quite different numbers of data points. If we intend to keep equal contribution from each original data point, the cluster centroids passed to a higher level in the hierarchy should be weighted and the clustering method should take those weights into account. We thus extended D2-clustering to a weighted version. As will be shown next, the extension is straightforward and results in little extra computation.

It is apparent that with weighted data, the step of nearest neighbor assignment of centroids to data points is unaffected, while the update of the centroids under a given partition of data is. Let us inspect the optimization in Eq. (3)

---

ALGORITHM 2: D2-Clustering and Constrained D2-Clustering.

Input: A collection of discrete distributions $v_1, v_2, \ldots, v_n$
Output: k centroids $z_1, z_2, \ldots, z_k$ (also discrete distributions), and the clustering labels
        $C(1), C(2), \ldots, C(n), C(\cdot) \in \{1, \ldots, k\}$
begin
  | Initialize k centroids
  | while objective function $\varepsilon(C)$ does not reach convergence do
1  |  | Allocate a cluster label to each data point $v_i$ by selecting the nearest centroid.
  |  | $C(i) = \arg\min_{j \in \{1, \ldots, k\}} D(v_i, z_j)$,
  |  | where $D(v_i, z_j)$ is the Mallows distance between $v_i$ and $z_j$.
2  |  | (For D2-clustering only) Invoke Algorithm 1 to update $z_j$'s. The input data when updating a
  |  | certain $z_j$ are the discrete distributions $\{v_{i:C(i)=j}\}$ assigned to the cluster.
2* |  | (For constrained D2-clustering only) Keep $p_{z_j}^{(\alpha)} = 1/s_j, \alpha = 1, \ldots, s_j$ fixed when invoking
  |  | Algorithm 1 to solve $z_j$. The linear programming in line 1 of Algorithm 1 can thus be separated
  |  | into several smaller ones and runs much faster. The result of $z_j$ is a uniform weighted bag of
  |  | vectors containing support vectors at optimized locations.
3  |  | Calculate the with-cluster dispersion $\varepsilon_j$ for each cluster j obtained by the previous label and
  |  | centroid update steps. Then sum them up to get the objective:
  |  | $\varepsilon(C) = \Sigma_{j=1}^{k} \varepsilon_j$.
  | end
end

---

The difference between D2-clustering and constrained D2-clustering is the way to update centroids in Step 2 of Algorithm 2. As discussed previously, we need to solve a large-scale linear programming problem in Algorithm 1 to update each $z_j$ in D2-clustering. The linear programming involves the optimization of $p_{z_j}^{(\alpha)}$ and $p_{\alpha,\beta}^{(i)}$, $\alpha = 1, \ldots, s_j$, $\beta = 1, \ldots t_i$, $i:C(i)=j$ ($\omega_{\alpha,\beta}^{(i)}$ is the matching weight between the a-th vector of $z_j$ and the β-th vector of $v_1$). This makes D2-clustering computationally complex.

In the constrained D2-clustering algorithm, we replace Step 2 by Step 2* in the D2-clustering algorithm. We simplify the optimization of D2-clustering by assuming uniform $p_{z_j}^{(\alpha)} = 1/s_j$, $\alpha = 1, \ldots, s_j$, for any $j = 1, \ldots, k$. With this simplification, in the linear programming problem in Step 1 of Algorithm 1, we only need to solve $\omega_{\alpha,\beta}^{(i)}$'s. Moreover, $\omega_{\alpha,\beta}^{(i)}$'s can be optimized separately for different i's, which significantly reduces the number of parameters in a single linear programming problem. More specifically, instead of solving one linear programming problem with a large number of parameters, we solve many linear programming problems with a small number of parameters. Due to the usual polynomial complexity of the linear programming problems, this can be done much faster than the original D2-clustering. Due to the usual polynomial complexity of the linear programming problems, this can be done much faster than the original D2-clustering.

for updating the centroid $z_j$ of one cluster. When data vi have weights $\omega_i$, a natural extension of the objective function is $$\min_{z_j^{(\alpha)}, p_{z_j}^{(\alpha)}: 1 \leq \alpha \leq s_j} \Sigma_{i=1}^{n_j} w_i D^2(z, v_i) \quad (4)$$

where $D(z_j, v_i)$ is defined in Eq. (3).

In Step 1 of Algorithm 1, we fix $z_j^{(\alpha)}$, $\alpha = 1, \ldots, s_j$, and solve a linear programming problem with objective function (3) under the same constraints specified in Eq. (1) to get the vector weights $p_{z_j}^{(\alpha)}$'s and a matching $\omega_{\alpha,\beta}^{(i)}$ between $z_j$ and each $v_i$, $i:C(i)=j$. Then in Step 2, the update for $z_j^{(\alpha)}$ is revised to a weighted version:

$$z_j^{(\alpha)} = \frac{\Sigma_{i:C(i)=j} w_i \Sigma_{\beta=1}^{t_i} \omega_{\alpha,\beta}^{(i)} v_i^{(\beta)}}{\Sigma_{i:C(i)=j} w_i \Sigma_{\beta=1}^{t_i} \omega_{\alpha,\beta}^{(i)}} \quad (5)$$

Because the optimal solution of centroid is not affected when the weights are scaled by a common factor, we simply use the number of original data points assigned to each centroid as its weight. The weights can be computed recursively when the algorithm goes through levels in the hierarchy. At the bottom level, each original data point is assigned with weight 1. The weight of a data point in a parent level is the sum of weights of its child data points.

Algorithmic Description

With details in several major aspects already explained earlier, we now present the overall flow of the parallel D2-clustering algorithm. The parallel program runs on a computation cluster with multiple processors. In general, there is a "master" processor that controls the flow of the program and some other "slave" processors in charge of computation for the sub-problems. In the implementation of parallel D2-clustering, the master processor performs the initial data segmentation at each level in the hierarchical structure specified in FIG. 1, and then distribute the data segments to different slave processors. Each slave processor clusters the data it received by the weighted D2-clustering algorithm independently, and send the clustering result back to the master processor. As soon as the master processor receives all the local clustering results from the slave processors, it combines these results and set up the data for clustering at the next level if necessary.

return until the data transmission is completed. Further, we can block the processors until all have reached a certain blocking point. In this way, different processors are enforced to be synchronized.

Figure 3:
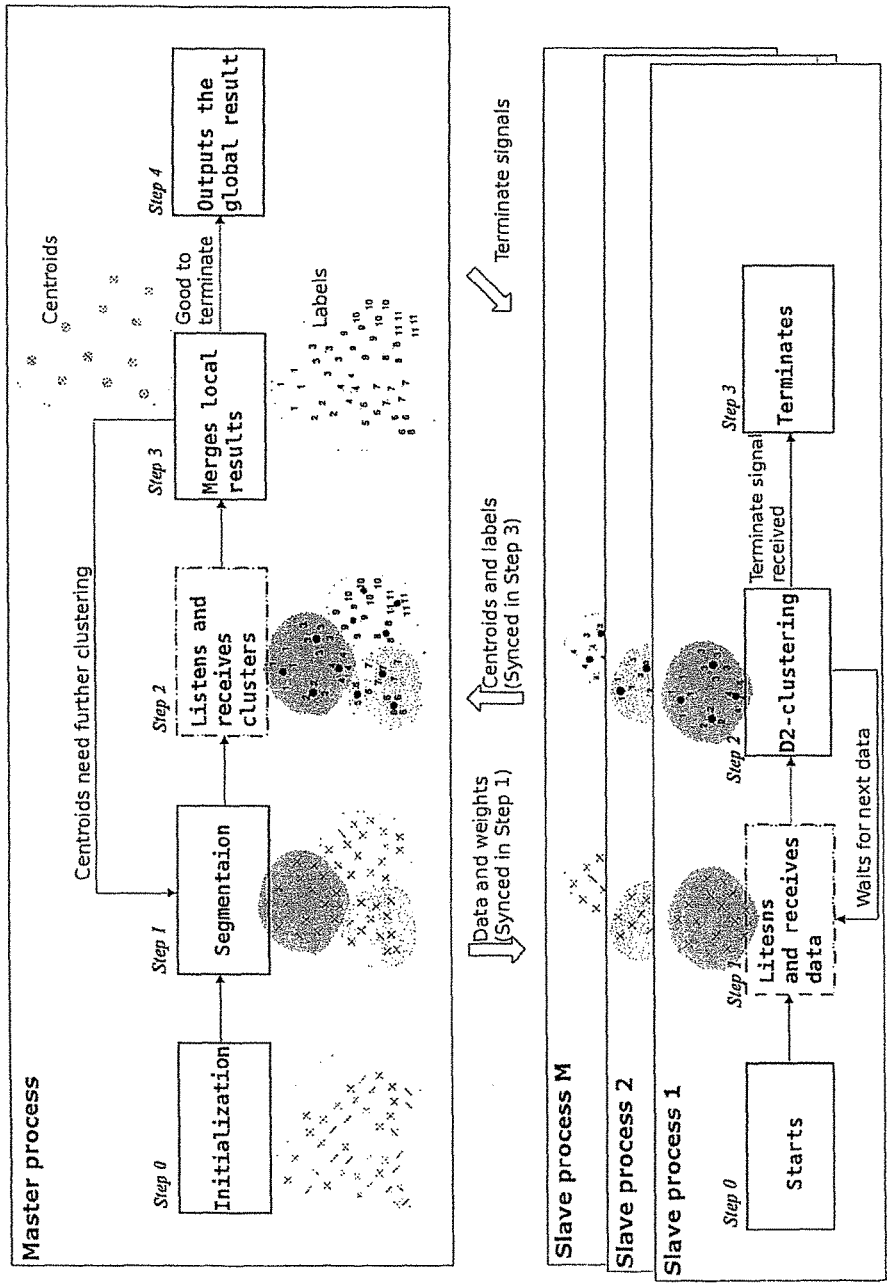
FIG. 3 depicts a work flow.

The algorithms running on the master and slave processors are formulated in Algorithms 3 and 4, respectively. FIG. 3 illustrates the algorithms on both sides in a visualized way. The master processor controls the work flow and makes the clustering work in a hierarchical way as described in FIG. 1. The hierarchy is constructed by the outmost loop in Algorithm 3, in which the operations in line 3-1 and line 3-2 relate the data between adjacent levels. Inside each level, the master distributes the data to slave processors and is then blocked until it gets all the clustering results from the slave processors. Each slave processor is also blocked until it gets the clustering request and data from the master processor. After performing D2-clustering and sending the results back to the master processor, a slave processor returns to a

---

ALGORITHM 3: Master Side of Parallel D2-clustering.

Input: A collection of discrete distributions $V = \{v_1, v_2, \ldots, v_N\}$, the desired cluster number k, and the number of slave processors M (slaves are with identical indices $1, 2, \ldots, M$).

Output: k centroids $Z = \{z_1, z_2, \ldots, z_k\}$ (also discrete distributions), and the clustering labels $C = (C(1), C(2), \ldots, C(N)), C(\cdot) \in \{1, \ldots, k\}$ begin
    $k' \leftarrow N; n \leftarrow N; \tilde{V} \leftarrow V; W = \{w_1, w_2, \ldots, w_N\} \leftarrow \{1, 1, \ldots, 1\}$.
    while $k' > k$ do 1-1    Segment the data objects $\tilde{V} = \{\tilde{v}_1, \tilde{v}_2, \ldots, \tilde{v}_n\}$ with weights $\tilde{W} = \{w_1, w_2, \ldots, w_n\}$ at current level into m groups, $V_1, \ldots, V_m$ by the constrained D2-clustering algorithm (Algorithm 2). Each $V_\mu$ contains no more than $\tau$ entries, and the corresponding weights for data in $V_\mu = \{v_{\mu,1}, v_{\mu,2}, \ldots, v_{\mu,n_\mu}\}$ is denoted as $W_\mu = \{w_{\mu,1}, w_{\mu,2}, \ldots, w_{\mu,n_\mu}\}$ The indices of data entries assigned to segment $\tilde{V}_\mu$ are stored in array $L_\mu(\cdot)$: $L_\mu(i') = i$ if $\tilde{v}_i = v_{\mu,i'}$.

foreach data segment $V_\mu$ do 1-2    Send a clustering request signal to slave processor with index $\eta = (\mu \mod M)$. The slave processor is notified with the number of data points $n_\mu$, and the desired cluster number $k_\mu$ first. Then $V_\mu$ and $W_\mu$ are sent to slave $\eta$.

end 2.1    Initialize loop parmeters. $m_c \leftarrow 0; k' \leftarrow 0; Z \leftarrow \emptyset; \tilde{C}(i) \leftarrow 0, i = 1, \ldots, n$.

while $m_c < m$ do 2-2    Wait for incoming message from any processor until getting the signal from slave $\eta$.

2-3    Receive segment id $\mu$, cluster centroids $Z_\mu = \{z_{\mu,1}, \ldots, z_{\mu,k_\mu}\}$, and cluster labels $C_\mu = \{C_\mu(1), \ldots, C_\mu(n_\mu)\}$ from slave $\eta$.

2-4    Merge $Z_\mu$ to Z by appending centroids in $Z_\mu$ to Z one by one.

2-5    Update cluster labels of data points in the receive segment by (6).
$$\tilde{C}(L_\mu(i)) = C_\mu(i) + k', i = 1, \ldots, n_\mu. \quad (6)$$

2-6    $k' \leftarrow k' + k_\mu; m_c \leftarrow m_c + 1$.

end 3-1    Update the cluster label of a data entry in the original dataset (bottom level), C(i), by inheriting label from its ancestor in $\tilde{V}$.
$$C(i) = \tilde{C}(C(i)), i = 1, \ldots, N.$$

3-2    Update data points and weights for the clustering at the next level:
    $\tilde{V} \leftarrow Z$;
    $w_i \leftarrow \Sigma_{\alpha:C(\alpha)=i} w_\alpha, i = 1, \ldots, k'$.

end
    foreach $\eta = 1, 2, \ldots, M$ do
    Send TERMINATE signal to the slave processor with id $\eta$.
    end
    return Z and C.
end

---

The current work adopts MPI for implementing the parallel program. In order to keep a correct work flow for both master and slave processors, we use synchronized communication methods in MPI to perform message passing and data transmission. A processor can broadcast its local data to all others, and send data to (or receive data from) a specific processor. Being synchronized, all these operations do not blocked and waiting status. In short, both the master and the slave processors have a working stage to perform the computation and a blocked stage to wait for data from the other side, which is fulfilled by the synchronized communication. When one side of the master or slave is performing computation, the other side is blocked and waiting for the computation results.

| ALGORITHM 4: Slave Side of Parallel D2-clustering (same process on each slave). |
|---|
| begin |
|    while true do |
| 1-1      Wait for signal from the master processor. |
|        if signal is TERMINATE then |
|           return. |
|        end |
| 1-2      Receive data segment id $\mu$, data in the segment $V_\mu = \{v_{\mu,1}, v_{\mu,2}, \ldots, v_{\mu,n_\mu}\}$ and the corresponding weights $W_\mu = \{w_{\mu,1}, w_{\mu,2}, \ldots, w_{\mu,n_\mu}\}$. |
| 2.1      Perform weighted D2-clustering on $V_\mu$ with weights $W_\mu$ by Algorithm 1 (using (4) and (5) when updating centroids). |
| 2-2      Send a clustering complete signal to the master processor. Then Send $\mu$, cluster centroids $Z_\mu = \{z_{\mu,1}, \ldots, z_{\mu,k_\mu}\}$ and cluster labels $C_\mu = \{C_\mu(1), \ldots, C_\mu(n_\mu)\}$ to the master processor. |
|    end |
| end |

In FIG. 3 and Algorithm 3, the loop in the master side (step 1 to step 3) constructs the hierarchical clustering structure level by level. Different levels work in the same manner, with V and $\tilde{W}$ updated by the master process in line 3-1 and line 3-2 of Algorithm 3 after the clustering at the current level is completed (at the bottom level $\tilde{V}=V$ and $\tilde{W}=\{1, 1, \ldots, 1\}$). In step 1, the master process runs data segmentation and distribution specified in line 1-1 and line 1-2 of Algorithm 3, and the slave processors are blocked until they hear data from the master, which is formulated in line 1-1 and line 1-2 of Algorithm 4. Then both the master and slave processor proceed to step 2, in which the master waits for the clustering result from the slaves and combines the received results from different slaves (line 2-1 to line 2-6 in Algorithm 3), and the slave processors performs local D2-clustering (line 2-1 and line 2-2 in Algorithm 4). The master and slave processors go back to step 1 if the condition for the hierarchy to proceed is satisfied (judged by the master processor). Otherwise the master processor terminates the program and returns the clustering result.

Proof of Convergence and Termination

The convergence of the parallel D2-clustering algorithm depends on the convergence of the processes running on both the master and slave sides as described in Algorithms 3 and 4. The master process distributes data to different slave nodes and constructs the hierarchical structure level by level. Within each level, the parallel clusterings are done by the slave processes, during which time the master process is blocked and waiting for the completion of all the parallel slave tasks. Therefore, the convergence properties on both sides need to be proved in order to confirm the overall convergence.

Lemma 1:

The iteration on the master side (Algorithm 3) always terminates.

Proof:

In each iteration of Algorithm 3, n data points are divided to m groups. Each group $\mu$ with $n\mu$ data entries ($\Sigma_{\mu=1}^{m} n_\mu = n$) are clustered separately into $k\mu$ clusters. The total number of clusters for all slave clustering tasks is $k'=\Sigma_{\mu=1}^{m} k_\mu$. For each sub-task $\mu$, $k\mu < n\mu$. Therefore, $k<n$, which means the data points in the next iteration is always less than the data in the current level. In other words, the condition to terminate the hierarchy ($k' \leq k$) is satisfied within finite number of iterations.

The slave processes terminate once they receive the termination signal from the master, which is guaranteed by LEMMA 1 if the clustering within each level terminates. The convergence of both the master and slave processes is accordingly determined by the convergence of (weighted) D2-clustering performed in step 2-2 of Algorithm 4. The D2-clustering algorithm, as well as the weighted version which is mathematically equivalent, are formulated in Algorithm 2, whose convergence is proved below.

Lemma 2:

The centroid update operation described in Algorithm 1 converges in finite time.

Proof:

Algorithm 1 operates in two steps within each iteration: first, update $p_z^{(\alpha)}$'s and $\omega_{\alpha,\beta}^{(i)}$'s by solving a linear programming problem; second, update $z^{(\alpha)}$'s by computing a weighted sum. For the first step, the linear programming minimizes the objective function (3) with $z^{(\alpha)}$'s fixed, which completes in polynomial time. With all the costs and constraints in the linear program being positive, it is proved that the solution is unique (Mangasarian, 1979). In addition, Murty (1983) show that the solution for a linear program lies in one of the extreme points of the simplex spanned by the constraints. Assume at loop $l_1$ and loop $l_2$ of the iteration ($l_1 = l_2$), the solutions for the linear program at step 1 are $S_{l_1} = \{[p_z^{(\alpha)}]_{l_1}, [\omega_{\alpha,\beta}^{(i)}]_{l_1}, \alpha=1, \ldots, s_j, i=1, \ldots, n_j, \beta=1, \ldots, t_i\}$ and $S_{l_2} = \{[p_z^{(\alpha)}]_{l_2}, [\omega_{\alpha,\beta}^{(i)}]_{l_2}, \alpha=1, \ldots, s_j, i=1, \ldots, n_j, \beta=1, \ldots, t_i\}$ respectively. Using $S_{l_1}$ and $S_{l_2}$, step 2 obtains $Z_{l_1} = \{[Z^{(1)}]_{l_1}, \ldots, [Z^{(s_j)}]_{l_1}\}$ and $Z_{l_2} = \{[Z^{(1)}]_{l_2}, \ldots, [Z^{(s_j)}]_{l_2}\}$. However, before the algorithm reaches a convergence $\varepsilon$ is strictly decreasing. Hence, $l_1 \neq S_{l_2}$. Because the possible number of extreme points on the linear programming simplex is finite and each extreme point is never visited twice as proved above, the loop converges within finite time.

Lemma 3:

D2-clustering and constrained D2-clustering described in Algorithm 2 converge in finite time.

Proof:

It is proved in (Selim and Ismail, 1984) that a K-means-type algorithm always converges to a partial optimal solution in a finite number of iterations. Together with Lemma 2, Algorithm 2 converges in finite time.

Using Lemma 1, 2 and 3, we can conclude the convergence of the parallel D2-clustering algorithm.

Theorem 4: The parallel D2-clustering algorithm described by Algorithms 3 (master process) and 4 (slave processes) can terminate within finite time.

Analysis and Proof of Time Complexity

In this section, we analyze the time complexity of the parallel D2-clustering algorithm because it is confirmed to converge.

As described earlier, for D2-clustering, the computational complexity of updating the centroid for one cluster in one iteration is polynomial in the size of the cluster. The total amount of computation depends on computation within one iteration as well as the number of iterations. Again, even for K-means clustering, the relationship between the number of iterations needed for convergence and the data size is complex. In practice, we often terminate the iteration after a pre-specified number of rounds (e.g., 500) if the algorithm has not converged before that. As a result, in the analysis of computational complexity, we focus on the time needed to complete one iteration and assume the time for the whole algorithm is a multiple of that, where the multiplication factor is a large constant.

Lemma 5:

When there are N discrete distributions in total and we want to cluster them into k clusters, the run-time for D2-clustering increases polynomially with N, and decreases polynomially with k.

Proof:

The linear programming to update a centroid is polynomial to the number of data points involved. Denote the order of polynomial as $\gamma$. Because the K-means-type clustering algorithms tend to form clusters with similar size, each cluster contains roughly N/k data entries. As a result, the centroid update of k cluster costs $O(k(N/k)^\gamma)$ time in total. Assume the number of iterations is linear to N, the clustering has polynomial run-time of $O(k^{1-\gamma}N^{\gamma+1})$.

When the number of discrete distributions grows and the number of clusters remains the same, the run-time grows in a polynomial order, which eventually makes D2-clustering slow and impractical in large-scale problems. In the proposed parallel algorithm, we divide data into segments at each level of the hierarchy. Each segment is no larger than $\tau$ in size, and clustered separately. Assume $\lambda$ clusters are to be formed, the run-time of the D2-clustering within a single segment is $O(\lambda_{1-\gamma}\tau_{\gamma+1})$. Here $\tau$ is set to be a fixed number within which scale the sequential D2-clustering can efficiently work. The $\lambda$ centroids are treated as data points at the next level and further clustered.

Define $$R = \frac{\tau}{\lambda},$$

which is the average number of data points within each cluster. It is also a factor that the data size shrinks at a certain level. The factor (referred as the shrinking factor thereafter) is important for the total run-time of the parallel D2-clustering algorithm.

Theorem 6:

The run-time for parallel D2-clustering is linearithmic to the total number of data points N.

Proof:

Based on Lemma 5, each local sequential D2-clustering within a certain neighboring segment of data costs $O(\gamma^{1-\gamma}\tau^{\gamma+1})=O(R^{\gamma-1}\tau^2)$ time.

In the ideal case, where there are always enough CPU cores to compute local clusterings in parallel, the total time for clustering is purely determined by the number of levels in the hierarchy of the parallel algorithm $L=\log_R N/k$ where R is the shrinking factor, N is the total number of data at the bottom level, and k is the desired number of clusters. And the clustering time is $$T_1 = O(R^{\gamma-1}\tau^2 L). \quad (7)$$

In practice, the hardware resources may be limited. At certain levels, especially lower levels of the hierarchy where the number of segments are large, not every segment can be assigned to an unique CPU core. Some segments have to share one CPU core and be clustered one by one in sequential. In such case, when there are M slave CPU cores and $1 \leq M \leq N/\tau$, the top $\log_R M+1$ levels are fully parallel due to small number of segments.

For lower levels, each CPU core needs to deal with multiple local clustering tasks. As a result, the total clustering time is $$T_2 = O\left(R^{\gamma-1}\tau^2\left[\log_R M + 1 + R + R^2 + \ldots + \frac{N}{\tau M}\right]\right) = \quad (8)$$

$$O\left(R^{\gamma-1}\tau^2\left[\log_R M + \frac{\frac{N}{\tau M}R - 1}{R - 1}\right]\right).$$

We can set $\tau=kR$ so that the clustering at the top level only consists of one segment. With Eq. (7) and Eq. (8), we can write the run-time for all the sequential clustering tasks as Eq. (9).

$$T_{clt} = \begin{cases} O\left(R^{\gamma+1}k^2\left[\log_R M + \frac{\frac{N}{kM}-1}{R-1}\right]\right), & \text{if } M < \frac{N}{kR}, \\ O\left(R^{\gamma+1}k^2\log_R \frac{N}{k}\right), & \text{if } M \geq \frac{N}{kR}. \end{cases} \quad (9)$$

In addition to the clustering, the data segmentation at each level also takes time. A binary splitting process is adopted to generate the segments. At a certain level with N data points, about $N'/\tau$ segments are generated. The constrained D2-clustering algorithm for each splitting runs in a similar order of K-means because it avoids large linear programming in the centroid update stage. For the simplicity of analysis, we assume the splitting tree is balanced and constrained D2-clustering has a linear time complexity. The total time to complete the splitting at a certain level is $0(N' \log N'/\tau)$. And the total time for data segmentation among all levels is $$T_{seg} = O\left(N\log\frac{N}{\tau} + \frac{N}{R}\log\frac{N}{R\tau} + \frac{N}{R^2}\log\frac{N}{R^2\tau} + \ldots + \frac{N}{R^{L-1}}\log\right. \quad (10)$$

$$\left.\frac{N}{R^{L-1}\tau}\right)$$

$$= O\left(N\log\frac{N}{\tau}\left(1 + \frac{1}{R} + \ldots + \frac{1}{R^{L-1}}\right) - N\log R\left(\frac{1}{R} + \frac{2}{R^2} + \ldots + \frac{L-1}{R^{L-1}}\right)\right)$$

$$= O\left(\frac{R}{R-1}\left[N\log\frac{N}{\tau} - k\log\frac{k}{\tau} - \frac{N-k}{R-1}\log R\right]\right)$$

$$= O\left(\frac{R}{R-1}\left[N\log\frac{N}{\tau} - (N-k)\frac{R}{R-1}\log R\right]\right).$$

In summary, the run-time for the parallel D2-clustering algorithm is $T=T_{clt}+T_{seg}$.

To simplify the analysis below, we assume there are always sufficient CPU cores to ensure parallel computing, i.e., $M \geq N/kR$ Combining $T_{clt}$ and $T_{seg}$ by constant coefficients $C_1$ and $C_2$, we get $$T = O\left(C_1 R^{\gamma+1}k^2\log_R \frac{N}{k} + C_2 \frac{R}{R-1}\left[N\log\frac{N}{k} - (N-k)\frac{R}{R-1}\log R\right]\right). \quad (11)$$

Evidently the leading order of the above run-time is O (N log N).

In fact, even if the number of CPU cores M=1, the algorithm's run-time is still faster than the original sequential D2-clustering because large linear programming problems in Eq. (3) are avoided. In Eq. (9) if M=1, $$T_{clt} = O\left(R^{\gamma+1}k^2 \frac{\frac{N}{k}-1}{R-1}\right),$$

which is linear to N.

From Eq. (11), we can also imply the value of the shrinking parameter R in the algorithm's hierarchy. Define $$C_4 = k^2 \log\frac{N}{k},\; C_5 = N\log\frac{N}{k},$$

and $C_6$=N−k. We rewrite Eq. (11) as $$T = C_1 C_4 \frac{R^{\gamma+1}}{\log R} + C_2 \frac{R}{R-1}\left[C_5 - C_6 \frac{R\log R}{R-1}\right].$$

Then we take the derivative of T over R.

$$\frac{dT}{dR} = C_1 C_4 \frac{R^{\gamma}[(\gamma+1)\log R - 1]}{(\log R)^2} + C_2 \frac{C_5 - C_6 R}{(R-1)^2}.$$

There is no analytical solution of the equation $$\frac{dT}{dR} = 0.$$

In order to plot the curve of $$\frac{dT}{dR},$$

we use N=1000 and k=10 which are typical values in our experiment to get $C_4$, $C_5$, and $C_6$. Because the data segmentation involves a constrained D2-clustering within each binary split, the constant multiplier $C_2$ is higher $C_1$. Without loss of generality, we set γ=3, $C_1$=1 and $C_2$=100.

Figure 4B:
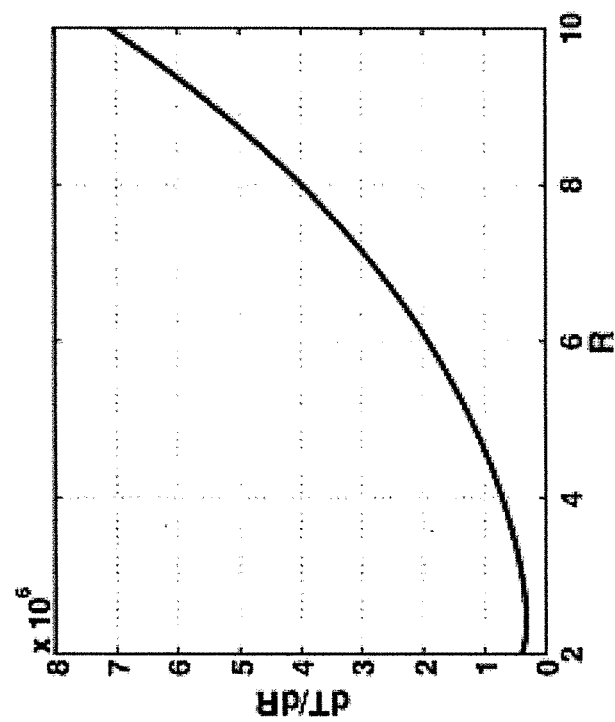
FIG. 4B shows the relationship between the run-time T (number of CPU cycles) and the shrinking factor R, wherein the derivative of T over R.
Figure 4A:
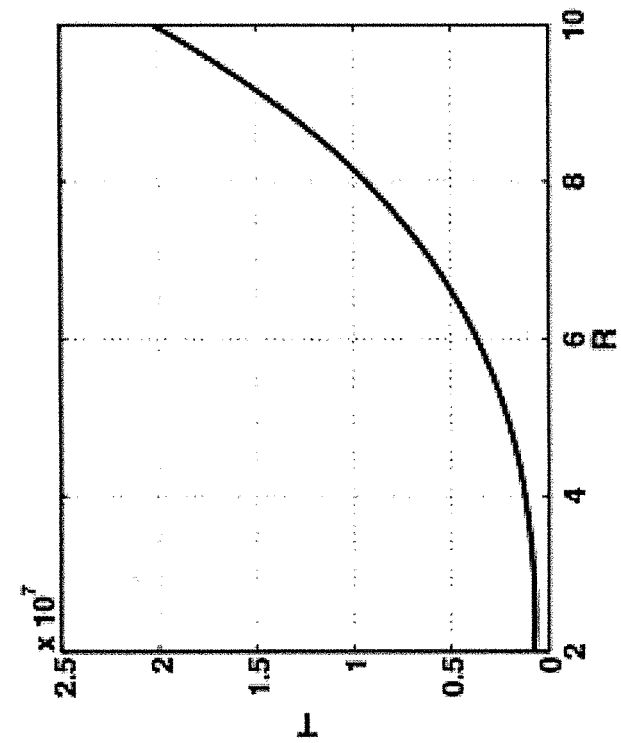
FIG. 4A shows the relationship between the run-time T (number of CPU cycles) and the shrinking factor R, wherein T is an increasing function of R.

FIGS. 4A and 4B shows the trend of T and $$\frac{dT}{dR}$$

with different values of R. In general the run-time T of the parallel D2-clustering is an increasing function of R. So a small R is favorable in terms of run-time. On the other hand, however, small R tends to create lots of parallel segments at each level of the hierarchy, and make the hierarchy with too many levels, which eventually increases the approximation error. In our implementation we set R=5, which is a moderate value that guarantees both the fast convergence of the algorithm and compactness of the hierarchical structure.

Experiments

To validate the advantage and usefulness of this algorithm, we conduct experiments on four different types of dataset: images, videos, protein sequences, and synthetic data. Though our work was originally motivated by image concept learning, we apply the parallel D2-clustering algorithm to different scenarios. Readers in these or other areas may find applications that are suitable to embed the algorithm into.

Images:

First, we test the algorithm on images crawled from Flickr in several experiments. When crawling images from Flickr, we use the Flickr API to perform keyword query for certain concepts, and download top N images with highest values of interestingness. The number of images N is different in different experiments. Typically it is at a scale of thousands, much larger than the scale the sequential D2-clustering has been applied. If such clustering is performed for multiple concepts, the training dataset for image tagging can easily reach several millions, which is quite large for image annotation.

For such image datasets, each image is first segmented into two sets of regions based on the color (LUV components) and texture features (Daubechies-4 wavelet (Daubechies, 1992) coefficients), respectively. We then use two bags of weighted vectors U and V, one for color and the other for texture, to describe an image as I=(u, v). The distance between two images, $I_i$=($u_i$,$v_i$) and $I_j$=($u_j$,$v_j$), is defined as $$\hat{D}(I_i, I_j) = (D^2(u_i, u_j) + D^2(v_i, v_j))^{\frac{1}{2}} \quad (12)$$

where D(•,•) is the Mallows distance. It is straightforward to extend the D2-clustering algorithm to the case of multiple discrete distributions using the combined distance defined in Eq. (12). Details are provided in (Li and Wang, 2008). The order of time complexity increases simply by a multiplicative factor equal to the number of distribution types, the so-called super-dimension.

To demonstrate the applicability of D2-clustering in real-world applications, we also apply the algorithm to a large-scale Flickr dataset for image concept learning, and evaluate the effectiveness of the clustering by the performance of the concept learning system.

Videos:

Second, we adopt videos queried and downloaded from Youtube. We represent each video by a bag of weighted vectors, and conduct parallel D2-clustering on these videos. Then we check the accordance between the clustering result and the videos' genre.

For the video clustering, we adopt the features used in (Yanagawa et al., 2007). Edge Direction Histogram (EDH), Gabor (GBR), and Grid Color Moment (GCM) features are extracted from each frame. A video is segmented into several sub-clips based on the continuity of these three features among nearby frames (Lienhart, 1999). Using the time percentage of each sub-clip as the weight of its average feature vector, we represent the video by a bag of weighted vectors by combining all sub-clips.

Protein Sequences:

Third, we download the SwissProt protein data (Boeckmann et al., 2003) provides the class labels of these protein sequences. Using the Prosite data, we can select protein sequences from several certain classes as the experiment dataset, which contains data gathering around some patterns. Each protein sequence is composed of 20 types of amino acids. We count the frequency of each amino acid in a sequence, and use the frequency as the signature of the sequence.

Synthetic data: The parallel program is deployed on a computation cluster at The Pennsylvania State University named "CyberStar" consisting of 512 quad-core CPUs and hence a total of 2048 computation units. These Intel Nehalem processors run at 2.66 GHz. Because M=2048, theoretically it can be guaranteed that at each level every data segment can be processed in parallel by a unique CPU core when the data size is several thousands. In practice the system puts a limit to the maximal number of processors each user can occupy at a time because it is a publicly shared server.

In this section, we first evaluate objectively the D2-clustering algorithm on image datasets with different topics and scales. Then we show the D2-clustering results for the image, video, protein, and synthetic datasets, respectively.

Comparison with Sequential Clustering

In order to compare the clustering results of the parallel and sequential D2-clustering, we have to run the experiment on relatively small datasets so that the sequential D2-clustering can finish in a reasonable time. In this experiment, 80 concepts of images, each including 100 images downloaded from Flickr, are clustered individually using both approaches. We compare the clustering results obtained for every concept.

It is in general challenging to compare a pair of clustering results, as shown by some sincere efforts devoted to this problem (Zhou et al., 2005). The difficulty comes from the need to match clusters in one result with those in another. There is usually no obvious way of matching. The matter is further complicated when the numbers of clusters are different. The parallel and sequential clustering algorithms have different initializations and work flows. Clearly we cannot match clusters based on a common starting point given by initialization. Moreover, the image signatures do not fall into highly distinct groups, causing large variation in clustering results.

We compare the clustering results by three measures.

Within-Cluster Dispersion:

First, we assess the quality of clustering by the generally accepted criterion of achieving small within-cluster dispersion, specifically, the mean squared distance between a data entry and its corresponding centroid.

Centroid-Based Difference:

Second, we define a distance between two sets of centroids. Let the first set of centroids be $Z=\{z_1, \ldots, z_k\}$ and the second set be $Z'=\{z'_1, \ldots, z'_{k'}\}$. A centroid $z_i$ (or $z'_i$) is associated with a percentage $p_i$ (or $p_i'$) computed as the proportion of data entries assigned to the cluster of $z_i$ (or $z'_i$). We define a Mallows-type distance $\tilde{D}(Z,Z')$ based on the element-wise distances $D(z_i,z'_j)$, where $D(z_i, z'_j)$ is the Mallows distance between two centroids, which are both discrete distributions. We call $D(Z,Z')$ Mallows-type because it is also the square root of a weighted sum of squared distances between the elements in $Z$ and $Z'$. The weights satisfy the same set of constraints as those in the optimization problem for computing the Mallows distance.

$$\tilde{D}^2(Z,Z')=\Sigma_{i=1}^{k}\Sigma_{j=1}^{k'}\omega_{i,j}D^2(z_i,z'_j), \quad (13)$$

subject to: $\Sigma_{j=1}^{k'}\omega_{i,j}=p_i$, $\Sigma_{i=1}^{k}\omega_{i,j}=p'_j$, $\omega_{i,j}\geq 0, i=1, \ldots, k, j=1, \ldots, k'$.

We refer to $\tilde{D}(Z, Z')$ as the MM distance (Mallows-type weighted sum of the squared Mallows distances).

Categorical Clustering Distance:

Third, we use a measure for two ways of partitioning a dataset, which is proposed by Zhou et al. (2005). This measure only depends on the grouping of data entries and is irrelevant with centroids. We refer to it as the categorical clustering distance. Let the first set of clusters be $P=\{P_1, P_2, \ldots, P_k\}$ and the second be $P'=\{P'_1, P'_2, \ldots, P'_{k'}\}$. Then the element-wise distance $D_p(P_i,P'_j)$ is the number of data entries that belong to either $P_i$ or $P'_j$, but not the other. The distance between the partitions $\tilde{D}_p(P,P')=\Sigma_{i=1}^{k}\Sigma_{j=1}^{k'}\omega_{i,j}D_p(P_i,P'_j)$ is again a Mallows-type weighted sum of $D_p(P_i,P'_j)$, $i=1, \ldots, k, j=1, \ldots, k'$. Details can be found in (Zhou et al., 2005).

Figure 5A:
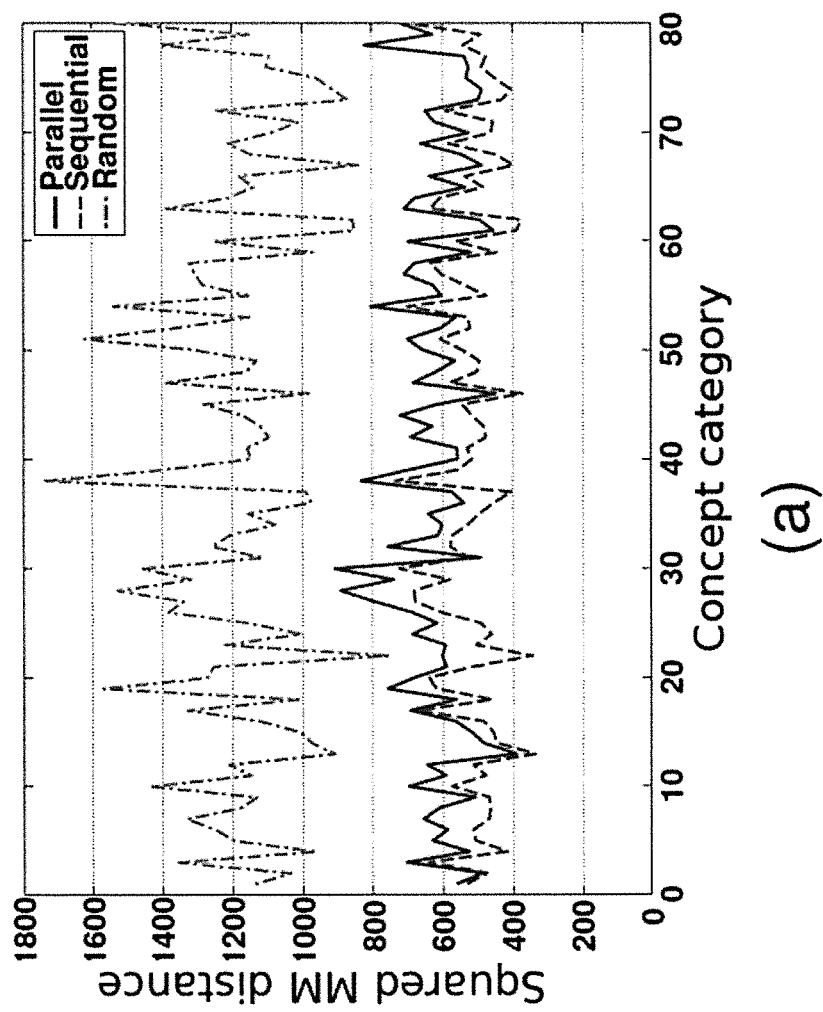
FIG. 5A is a plot of mean-squared distances.

For each concept category, the number of clusters is set to 10. The mean squared distance from an image signature to its closest centroid is computed based on the clustering result obtained by the parallel or sequential D2-clustering algorithm. These mean squared distances are plotted in FIG. 5A. We also compute the mean squared distance using randomly generated clusters for each concept. The random clustering is conducted 10 times and the average of the mean squared distances is recorded as a baseline. The random clusters, unsurprisingly, have the largest mean squared distances. In comparison, the parallel and sequential algorithms obtain close values for the mean squared distances for most concepts. Typically the mean squared distance by the parallel clustering is slightly larger than that by the sequential clustering. This shows that the parallel clustering algorithm compromises the tightness of clusters slightly for speed.

Figure 5B:
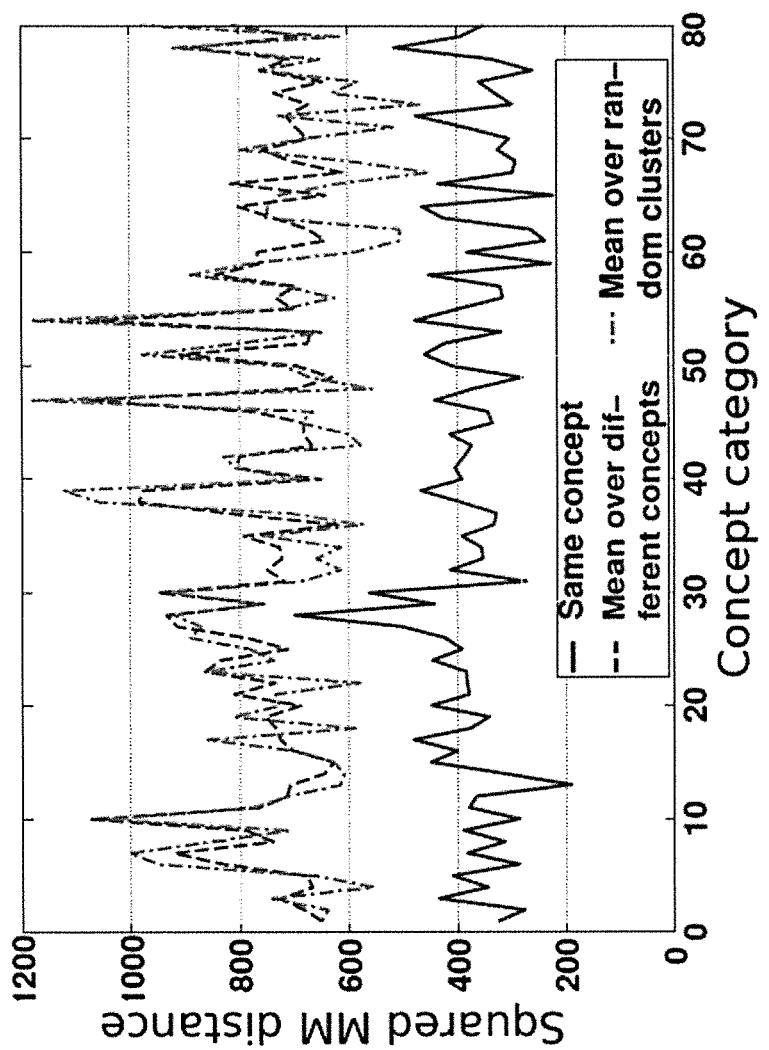
FIG. 5B compares the clustering results using the MM distance between sets of centroids acquired by different methods.

FIG. 5B compares the clustering results using the MM distance between sets of centroids acquired by different methods. For each concept i, the parallel algorithm generates a set of centroids $Z_i=\{z_1, \ldots, Z_k\}$ and the sequential algorithm generates a set of centroids $Z'_i=\{z'_1, \ldots, z'_{k'}\}$. The solid curve in FIG. 5B plots $D^2(Z_i,Z_i')$ for each concept i. To demonstrate that $\tilde{D}(Z_i,Z_i')$ is relatively small, we also compute $\tilde{D}(Z_i,Z_i')$ for all pairs of concepts $i \neq j$. Let the average $$d_i^2 = \frac{1}{c-1}\sum_{j=1, j\neq i}^{c} \tilde{D}^2(Z_i, Z'_j),$$

where c=80 is the number of concepts. We use $d_i^2$ as a baseline for comparison and plot it by the dashed line in the figure. For all the concepts, $d_i$ is substantially larger than $\tilde{D}(Z_i,Z_i')$, which indicates that the set of centroids $Z_i$ derived from the parallel clustering is relatively close to $Z'_i$ from the sequential clustering. Another baseline for comparison is formed using random partitions. For each concept i, we create 10 sets of random clusters, and compute the average over the squared MM distances between $Z_i$ and every randomly generated clustering. Denote the average by $\tilde{d}_i^2$, shown by the dashed dot line in the figure. Again comparing with $\tilde{d}_i^2$, the MM distances between $Z_i$ and $Z'_i$ are relatively small for all concepts i.

Figure 5C:
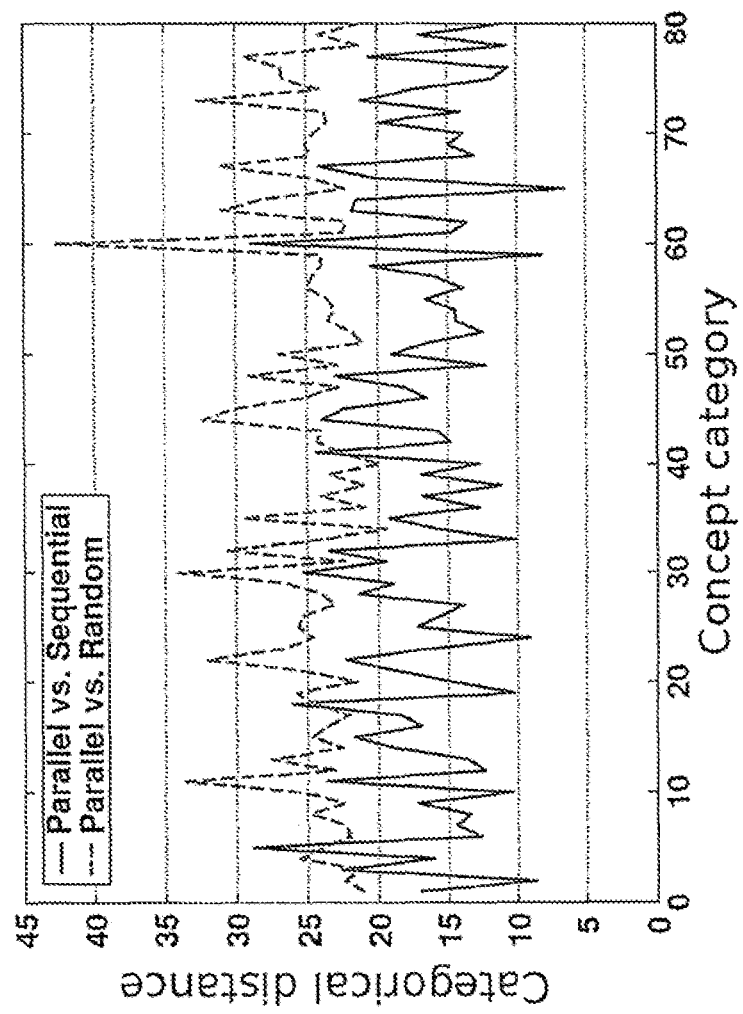
FIG. 5C plots the categorical clustering distance between the parallel and sequential clustering results for every image concept.

FIG. 5C plots the categorical clustering distance defined by Zhou et al. (2005) between the parallel and sequential clustering results for every image concept. Again, we compute the categorical clustering distance between the result from the parallel clustering and each of 10 random partitions. The average distance is shown by the dash line in the figure. For most concepts, the clustering results from the two algorithms are closer than those from the parallel algorithm and random partition. However, for many concepts, the categorical clustering distance indicates substantial difference between the results of the parallel and sequential algorithm. This may be caused to a large extent by the lack of distinct groups of images within a concept. In summary, based on all the three measures, the clustering results by the parallel and sequential algorithms are relatively close.

Scalability Property

The parallel D2-clustering runs in approximately linearithmic time, while the sequential algorithm scales up poorly due to its polynomial time complexity. In order to demonstrate this, we perform clustering on sets of images with different sizes using both the parallel and sequential D2-clustering with different conditions, and examine the time consumed.

Figure 6:
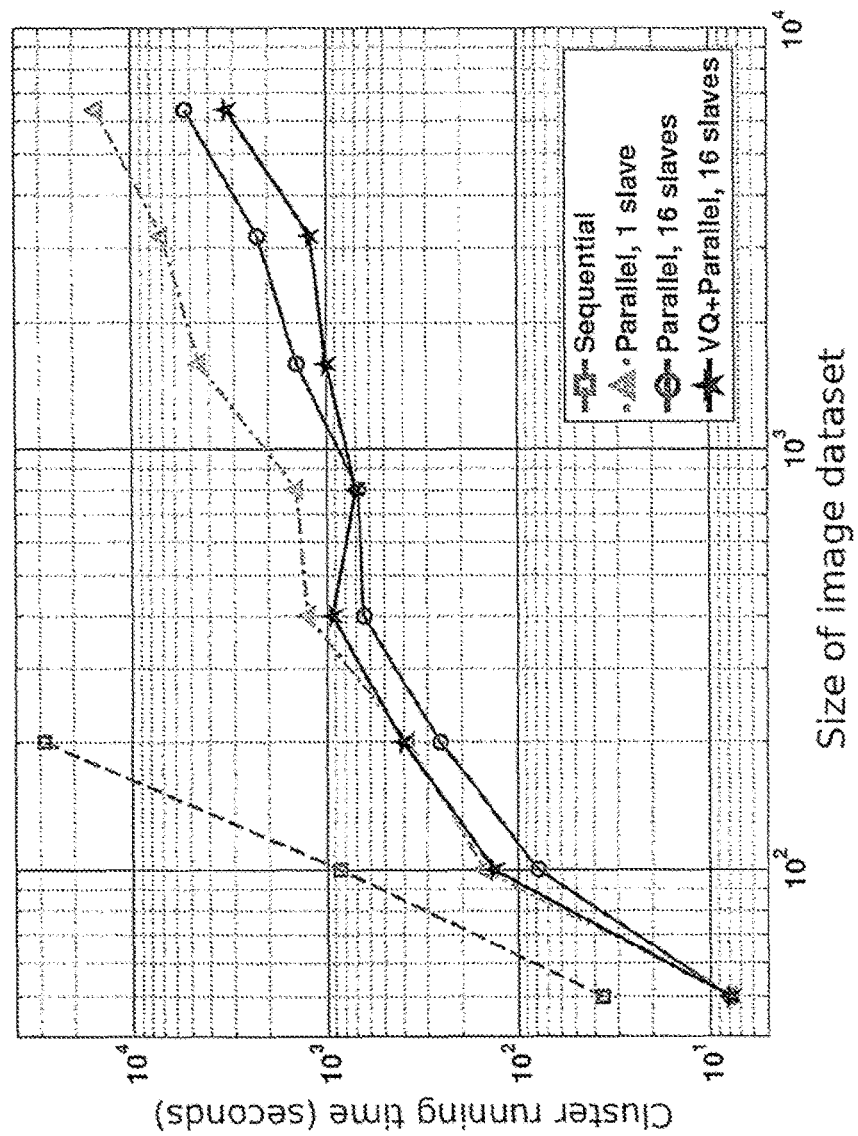
FIG. 6 shows how the parallel algorithm scales up approximately at linearithmic rate.

FIG. 6 shows the running time on sets of images in the concept "mountain". In the plot, both axes are in logarithmic scales. All versions of clusterings are performed on datasets with sizes 50, 100, 200, 400, 800, 1600, 3200, and 6400. We test the parallel D2-clustering algorithm in three cases with identical parameters $\tau=50$ and $e=5$. In the first case, there is only one slave CPU handling all the clustering requests sent by the master CPU (i.e. there are two CPUs employed in total). All clustering requests are therefore processed sequentially by the only slave processor. In the second case, there are 16 slave CPUs (i.e. 17 CPUs in total). In the third case, the conditions are the same to the second case, but the data segmentation is implemented by a Vector Quantization (VQ) (Gersho and Gray, 1992) approach instead of the approach described earlier. For comparison, the original sequential D2-clustering algorithm is also tested on the same datasets.

FIG. 6 shows the parallel algorithm scales up approximately at linearithmic rate. On a log-log plot, this means the slope of the curve is close to 1. The number of slave CPUs for the parallel processing contributes a linear difference (the second term in Eq. (7)) to the run-time between the first and second parallel cases. When N is small, the linear difference may be relatively significant and make the single CPU case much slower than the multiple CPU case. But the difference becomes less so when the dataset is large because there is a dominant linearithmic term in the run-time expression. Nevertheless, in either case, the parallel algorithm is much faster than the sequential algorithm. The slope of the curve on the log-log plot for the sequential algorithm is much larger than 1, indicating at least polynomial complexity with a high degree. As a matter of fact, the parallel algorithm with 16 slave CPUs takes 88 minutes to complete clustering on the dataset containing 6400 images, in contrast to almost 8 hours consumed by the sequential algorithm running only on the dataset of size 200. Because the time for the sequential D2-clustering grows dramatically with the data size, we can hardly test it on dataset larger than 200.

For the last parallel case, we include VQ in the segmentation in order to further accelerate the algorithm. Based on the analysis above, we know that data segmentation takes a lot of time at each level of the algorithm. In the VQ approach, we quantify the bag of weighted vectors to histograms and treat them as vectors. These histograms are then segmented by K-means algorithm in the segmentation step. The clustering within each segment is still D2-clustering on the original data. However the time spent for segmentation is much shorter than the original approach. In FIG. 6 the acceleration is reflected by the difference between the run-time curves of parallel D2-clustering with and without VQ segmentation when N is large. When N is small and the data segmentation is not dominant in the run-time, VQ will usually not make the clustering faster. In fact due to bad segmentation of such a coarse algorithm, the time consumed for D2-clustering within each segment might be longer. That is the reason why the parallel D2-clustering with VQ segmentation is slower than its counterpart without VQ segmentation (both have same parameters and 16 slave CPUs employed) in FIG. 6 when N is smaller than 800.

Theoretically VQ can reduce the order of the clustering from linearithmic to linear (because $T_{seg}$ in Eq. (10) is reduced to a linear order). However because the quantization step loses some information, the clustering result might be less accurate. This can be reflected by the MM distance (defined in Eq. (13)) between the parallel D2-clustering with VQ segmentation and the sequential D2-clustering results on a dataset containing 200 images, which is 19.57 on average for five runs. Compared to 18.41 as the average MM distance between the original parallel D2-clustering and sequential D2-clustering results, the VQ approach makes the parallel clustering result less similar to the sequential clustering result which is regarded as the standard.

No matter whether VQ is adopted, the experiment shows the acceleration of parallel D2-clustering over the sequential algorithm, which verifies the run-time analysis. Applying the algorithm, we can greatly increase the scale of discrete distribution clustering problems.

Visualization of Image Clustering

Simulating the real image annotation application, the parallel D2-clustering algorithm is applied to a set of 1,488 images downloaded from Flickr ($z=50$, $e=5$). These images are retrieved by query keyword "mountain". For such a set, we do not have ground truth for the clustering result, and the sequential D2-clustering cannot be compared because of its unrealistic running time. We thus visualize directly the clustering result and attempt for subjective assessment.

Figure 7:
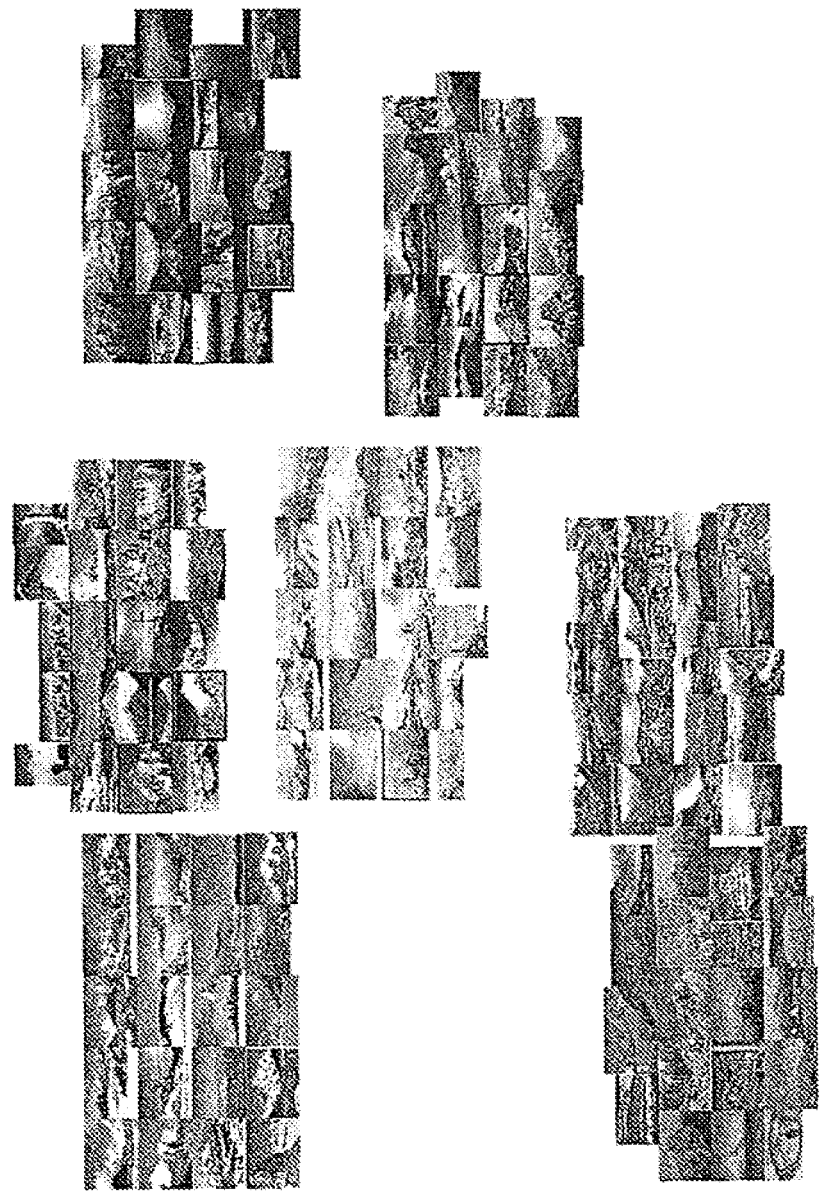
FIG. 7 shows how images with similar color and texture are put in the same clusters.
Figure 8B:
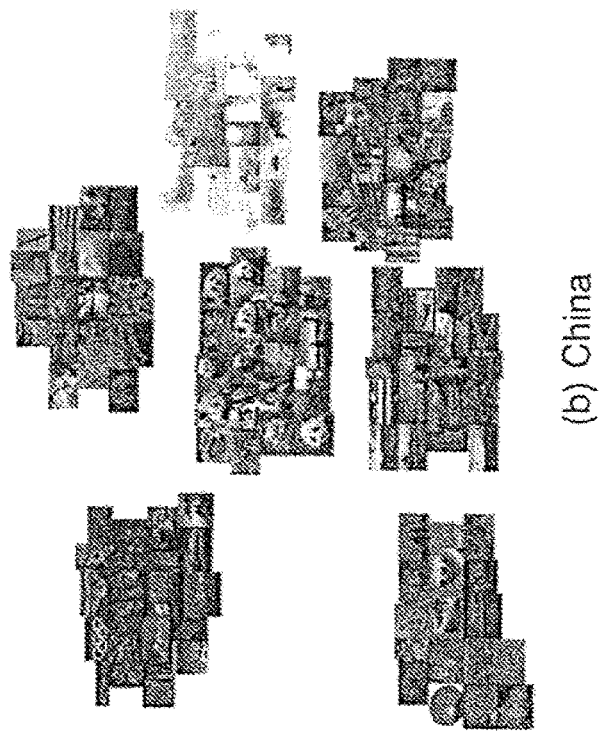
FIGS. 8A-8D provide more clustering results for images with different concepts.
Figure 8A:
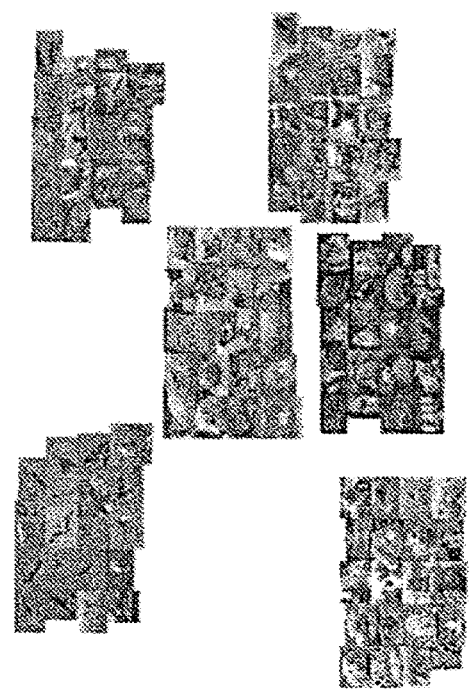
Figure 8D:
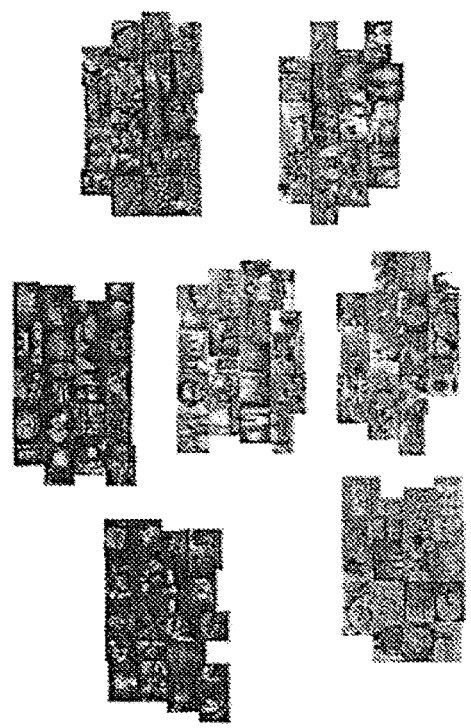
Figure 8C:
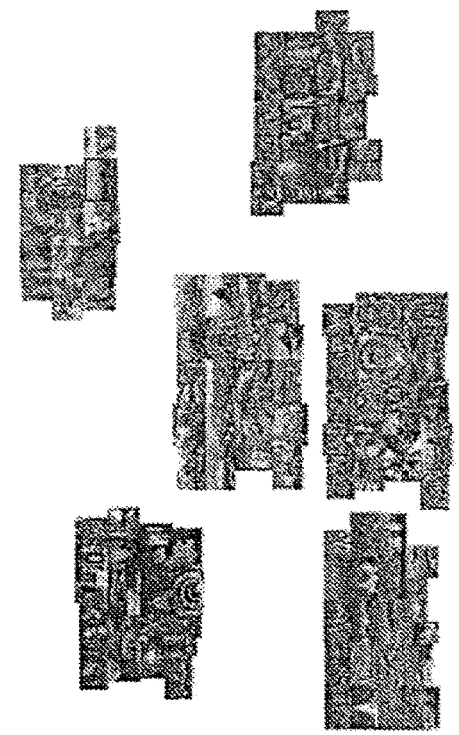

The 1,488 images are clustered into 13 groups by the parallel D2-clustering algorithm using 873 seconds (with 30 slave CPUs). At the end, there are 7 clusters with sizes larger than 100, for each of which 20 images closest to the corresponding cluster centroid are displayed in groups in FIG. 7. In the figure we try to manually arrange similar clusters close, and dissimilar ones far away based on the Mallows distances between the cluster centroids. FIG. 7 shows that images with similar color and texture are put in the same clusters. More clustering results for images with different concepts are shown in FIGS. 8A-8D. For all the datasets, visually similar images are grouped into the same clusters. The parallel algorithm has produced meaningful results.

Image Concept Modeling by the Clustering Results

The D2-clustering result can be used for image concept modeling as introduced in ALIPR (Li and Wang, 2008). For images within each concept, we perform a D2-clustering. We then use the clustering result to build a Gaussian Mixture Model (GMM) for the concept by fitting each cluster to a Gaussian component in the GMM.

Because both the image descriptors and the cluster centroids are discrete distributions rather than vectors, we are not able to directly fit a Gaussian component by estimating a covariance matrix which is the second order statistics between every two dimensions in the Euclidean space. Instead, we use the Hypothetical Local Mapping (HLM) to map these discrete distributions to a probability space where they follow a Gaussian distribution. If the squared distances from data points in a cluster to the centroid follow a Gamma distribution Gamma($d/2, 2\sigma^2$) with pdf $$f(u) = \frac{\left(\frac{u}{2\sigma^2}\right)^{\frac{d}{2}-1} e^{-\frac{u}{2\sigma^2}}}{2\sigma^2 \Gamma\left(\frac{d}{2}\right)},$$

the data points on the hypothetical space follow a multivariate Gaussian distribution $N(z,\sigma^2 I_d)$ with pdf $$f(x) = \left(\frac{1}{\sqrt{2\pi\sigma^2}}\right)^d e^{-\frac{u}{2\sigma^2}},$$

where $u=\tilde{D}^2(x,z)$ is the squared distance from a data point x to the corresponding centroid z. The percentage size of a cluster is used as the weight for the component. As a result, we estimate the image concept model for concept $\psi$ as $f_\psi(x) = \sum_{i=1}^k \xi_i f_\psi^i(x)$, where $\xi i$ is the percentage size for the i-th cluster with Gaussian distribution $f_\psi^i(x)$ estimated by HLM.

With the parallel algorithm, we can run the clustering on much larger datasets than ALIPR did, and hence build concept models covering broader aspects of each concept. When a query image comes, we apply the Bayesian's law to estimate the posterior probability it belongs to each concept, and eventually generate annotations.

We crawled images from Flickr for this experiment. For each of the 144 most popular tags on Flickr, top 1,000 images ranked by interestingness are downloaded as the training data for concept learning. After performing parallel D2-clustering on each concept set, we used HLM to build a GMM for the concept. As a comparison, we also use the original sequential D2-clustering algorithm to build the concept models. Due to the incapability of the sequential algorithm running on large dataset, the sequential clustering is only applied on the top 100 most interesting images for each concept.

The testing images are also crawled by keyword query, but ranked by uploading date in descending order. They are crawled several months after the downloading of the training set. Therefore, the testing set is guaranteed to be different to the training set. Because the user-generated tags on Flickr are noisy, there are many irrelevant images in each concept set. In addition, for certain abstract concepts, such as "day" and "travel", in which no apparent objects and visual patterns exists, it is difficult even for human to judge whether an image is relevant to the concept without any non-visual context. Therefore we handpicked the testing images and only kept images with visual features confidently related to the corresponding query, which is regarded as the ground-truth labels. At last we build an testing set containing 3,325 images from 75 concepts.

We compute and rank the posterior probability of a testing image belonging to every concept model trained by the clustering result. If the ground-truth label of the image gets a high posterior probability, the result is meaningful for annotation. We regard the result relevant if the top five predicted concepts contain the ground-truth label. Using the concept models obtained by the parallel D2-clustering results, 1111 testing images (33.4%) get relevant concept predictions. Whereas by the models from the sequential clustering, only 875 testing images (26.3%) are correctly tagged.

FIG. 9 presents some examples of the concept prediction experiment. Because the training data are small and noisy for the sequential D2-clustering algorithm, the concept models obtained by its clustering results do not well depict the probabilistic distribution of the visual descriptors, and hence fail to generate accurate predictions. The concept prediction by the models from parallel D2-clustering's results have a better performance. Usually the top predicted concepts are more relevant than those from the sequential models, even though sometimes the user-generated labels on Flickr are noisy. For instance, for the third image, it is crawled as an image with the concept "summer" from Flickr. The models obtained from the parallel clustering results successfully categorize the image to some more relevant concepts.

The advantage of the non-parametric concept modeling approach is that it can well depict the probabilistic distribution of every concept on the feature space, at the same time be robust to noise. The number of training data is crucial to the estimation of the model. More training data covering more variants of a concept can help us better build the model. Therefore the models obtained by the parallel D2-clustering algorithm which runs on a larger dataset outperform the models built from the small dataset by sequential clustering. Additionally, we can observe that in the large training dataset, the images are noisy data directly crawled from Flickr, but the concept models can still get satisfactory performance for image annotation, which demonstrates the robustness of the approach. In practice it is still preferable to get clean data for training, where the tag refinement technique (Sawant et al., 2013) can be adopted to remove some (though not all) of the noise and hence further enhance the system performance. In conclusion, the parallel D2-clustering algorithm is practical in real-world image annotation applications, where training images within every single concept are variant in visual appearances, large in size, and noisy in user-generated tags.

Video Clustering

To demonstrate the application of parallel D2-clustering on video clustering, we download 450 videos from Youtube. They are all 5 to 20 minutes in length, and come from 6 different queries, which are "news", "soccer", "lecture", "movie trailer", "weather forecast", and "tablet computer review". Each category contains 75 videos. We compare the clustering result with the category label to check the correctness of the algorithm.

It should be emphasized that video classification is a complicated problem. Since our algorithm is an unsupervised clustering algorithm rather than a classification method, we cannot expect it to classify the videos with a high accuracy. In addition, though not the major concern in this paper, the visual features for segmenting and describing videos are crucial for the accuracy of the algorithm. Here we only adopt some easy-to-implement simple features for demonstration. Therefore the purpose of this experiment is not to pursue the best video classification, but to demonstrate the reasonable results of the parallel D2-clustering algorithm on videos. The videos' class labels, which serve as the ground truth, are used as a reference to show whether similar videos can be clustered into a same group.

In this experiment, we set $\tau=30$, $e=5$, and request 15 slave CPUs (M=15) to cluster the data. As mentioned above, we adopt three visual features, EDH, GBR, and GCD, to segment and describe each video. We extract the features and form the video descriptors before the clustering. Typically a video will be segmented into 10 to 30 sub-clips, depending on its content and length. In addition, the feature vector itself is high in dimension (73 for EDH, 48 for GBR, and 225 for GCD). As a result, each video is represented by a large bag of weighted vectors.

By applying the parallel D2-clustering algorithm, we can get a clustering result for this high dimensional problem in 847 seconds. 6 major clusters (C1-C6) are generated and Table II is the confusion table. We then try to use the clustering result for classification by assigning each cluster with the label corresponding to its majority class. For these six clusters, the unsupervised clustering achieves a classification accuracy of 47.5%.

TABLE II

Video clustering result by parallel D2-clustering.

| | Cluster (Size) | | | | | |
|---|---|---|---|---|---|---|
| | C1 (81) | C2 (36) | C3 (111) | C4 (40) | C5 (72) | C6 (75) |
| Soccer | 43 | 5 | 1 | 1 | 8 | 10 |
| Tablet | 19 | 23 | 14 | 1 | 9 | 4 |
| News | 9 | 3 | 27 | 6 | 17 | 5 |
| Weather | 4 | 0 | 31 | 32 | 1 | 0 |
| Lecture | 4 | 2 | 32 | 0 | 17 | 13 |
| Trailer | 2 | 3 | 6 | 0 | 20 | 43 |

Protein Sequence Clustering

Sequence clustering is a basic problem in bioinformatics. The protein or DNA sequences are normally huge in number and complex in distance measures. It is a trending topic on how to develop fast and efficient biological sequence clustering approaches on different metrics, e.g. (Voevodski et al., 2012; Huang et al., 2010). Composition-based methods for sequence clustering and classification, either DNA (Kelley and Salzberg, 2010; Kislyuk et al., 2009) or protein (Garrow et al., 2005), use the frequencies of different compositions in each sequence as the signature. Nucleotides and amino acids are basic components of DNA and protein sequence respectively and these methods use a nucleotide or amino acid histogram to describe a sequence.

Because different nucleotide or amino acid pairs have different similarities determined by their molecular structures and evolutionary relationships, cross-term relations should be considered when we compute the distance between two such histograms. As a result, the Wasserstein distance would be a proper metric in composition-based approaches. However, due to the lack of effective clustering algorithms under the Wasserstein distance, most existing clustering approaches either ignore the relationships between the components in the histograms and treat them as variables in a vector, or perform clustering on some feature vectors derived from the histograms. In this case, D2-clustering will be especially appealing. Considering the high dimensionality and large scale of biological data, parallel algorithm is necessary.

In this experiment, we perform parallel D2-clustering on 1,500 protein sequences from Swiss-Prot database, which contains 519,348 proteins in total. The 1,500 proteins are selected based on Prosite data, which provides class labeling for part of Swiss-Prot database. We randomly choose three classes from Prosite data, and extract 500 protein sequences from Swiss-Prot database for each class to build our experiment dataset.

Each protein sequence is transformed to a histogram of amino acid frequencies. There is a slight modification in the computation of the Wasserstein distance between two such histograms over the 20 amino acids. In Eq. (1), the squared Euclidean distance between two support vectors is replaced by a pair-wise amino acid distance provided in the PAM250 mutation matrix (Pevsner, 2003). Given any two amino acids A and B, we can get the probabilities of A mutated to B and B mutated to A from the matrix. The distance between A and B is defined as $$D_{PAM250}(A,B) = \log(P(A|B) + P(B|A)).$$

Figure 10A:
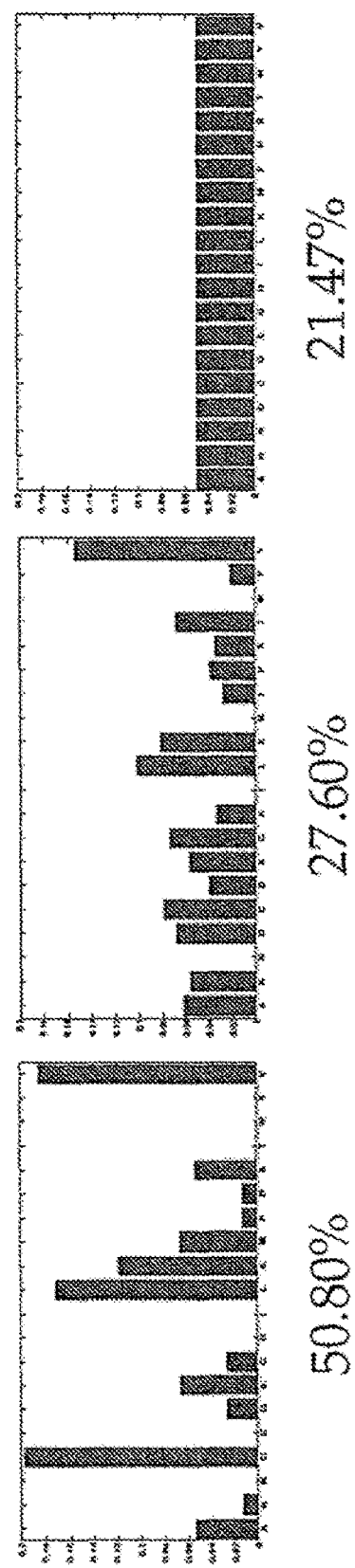
FIG. 10A describes clustering centroids.

Because the support vectors for each descriptor are the 20 types of amino acids and hence symbolic, we will skip the step to update support vectors in the centroid update of D2-clustering (refer to Step 2 in Algorithm 1) in the implementation of the parallel D2-clustering algorithm in this case. We set $\tau=30$, $e=5$, and request 7 slave processors to perform the parallel clustering (M=7). We let the program generate 5 clusters and the clustering finishes in about 7 hours. Considering the high dimensionality of the histograms and the scale of the dataset, this is a reasonable time. Three out of the five clusters are major ones, which contain more than 99% of the dataset. FIG. 10A describes the clustering centroids.

If we do not consider cross-term differences in the distance between two histograms and use Euclidean distance as the metric, the clustering is reduced to K-means. Therefore in this application, we are able to apply K-means on the dataset. Running on the multi-CPU server, the K-means algorithm is also implemented by parallel programs. We parallelize K-means in two different ways. In the first one, we apply the approach suggested by Kantabutra and Couch (2000), which is to perform centroid update and label update in parallel for different segments of data and then combine partial result linearly. In this way the parallelization is equivalent to the original K-means on the whole dataset. In the second way, we adopt the same hierarchical clustering structure, as in FIG. 1, used in the parallel D2-clustering algorithm and only replace the Wasserstein distance by the Euclidean distance. Thus within each data segment at any level of the hierarchy, the locally performed clustering is K-means. However there will be some loss of accuracy since several data are grouped and treated as one object at higher levels' clustering, and will never be separated thereafter. For short, we refer to the first implementation as parallel K-means and the second one as hierarchical K-means.

Figure 10B:
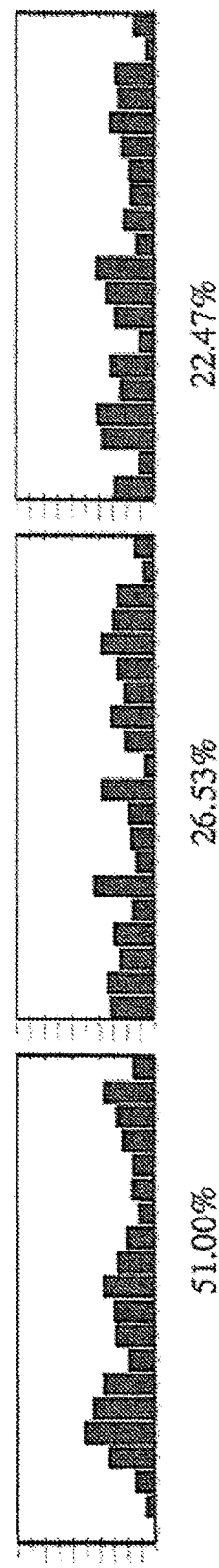
FIG. 10B and FIG. 10C show the clustering centroids generated by parallel K-means and hierarchical K-means, running on the same dataset with identical parameters.
Figure 10C:
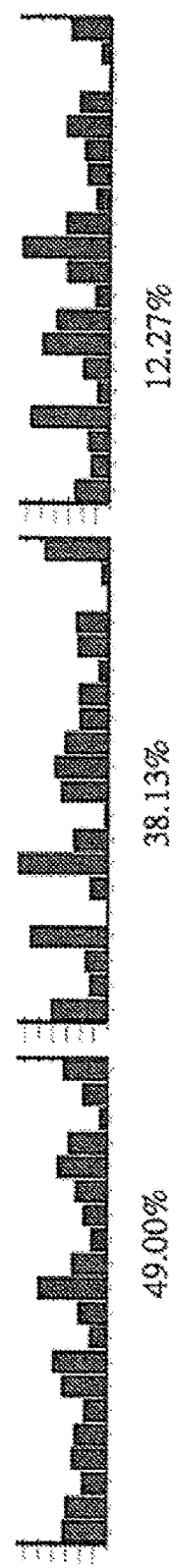
Figure 11A:
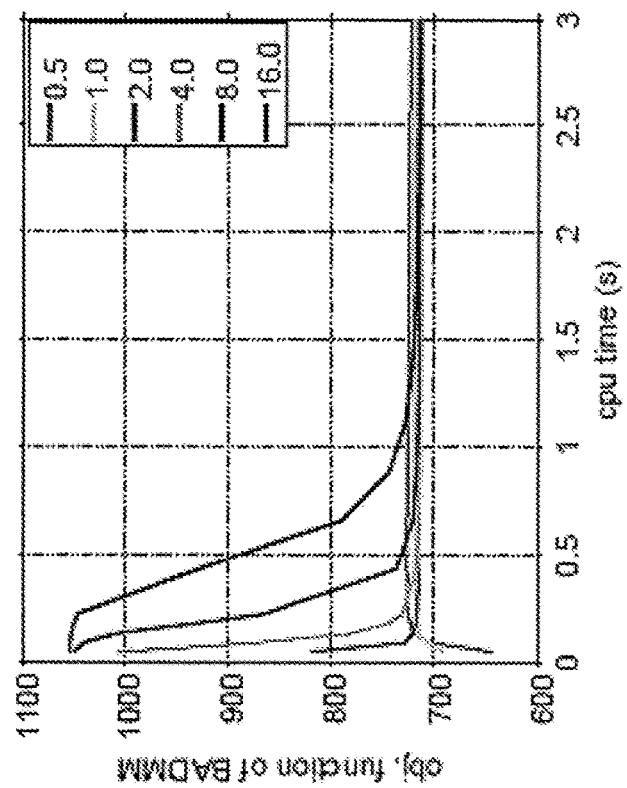
Figure 11B:
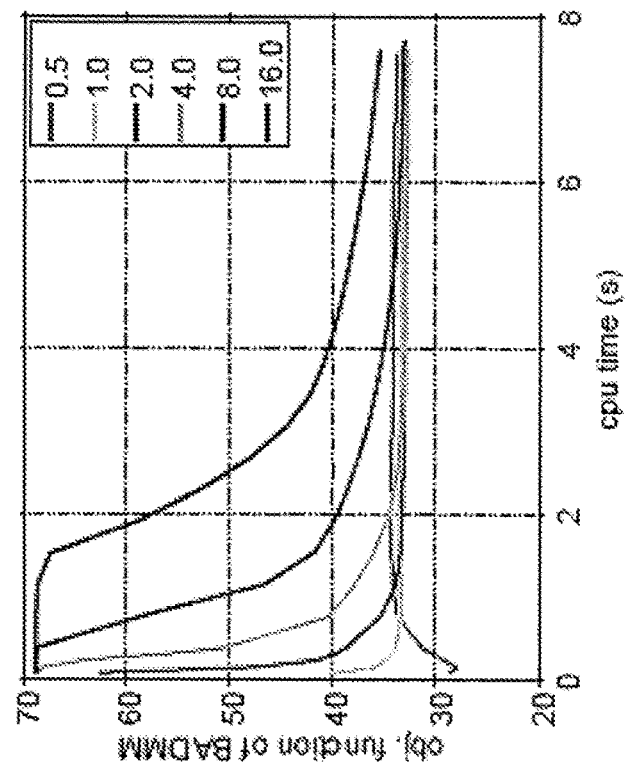
Figure 11D:
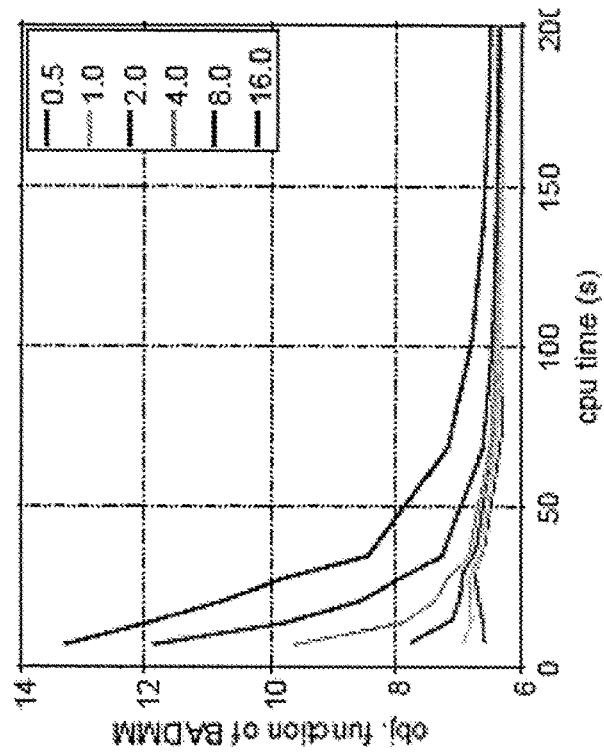
Figure 11C:
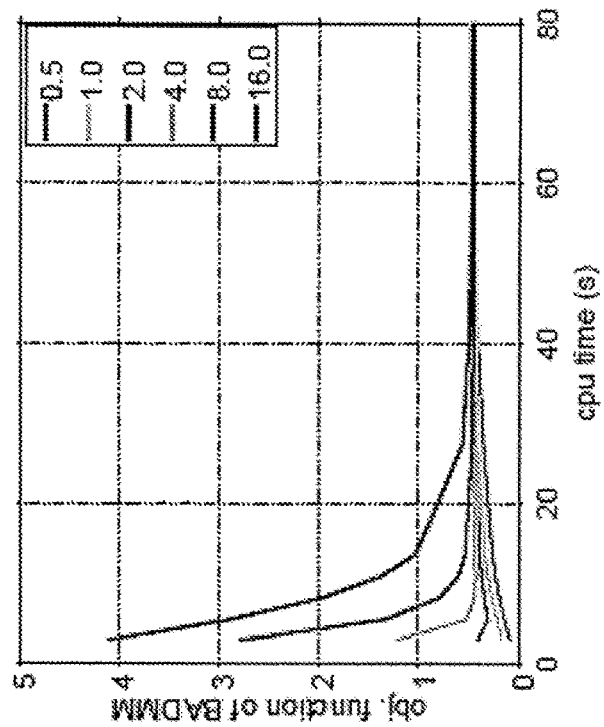
Figure 11F:
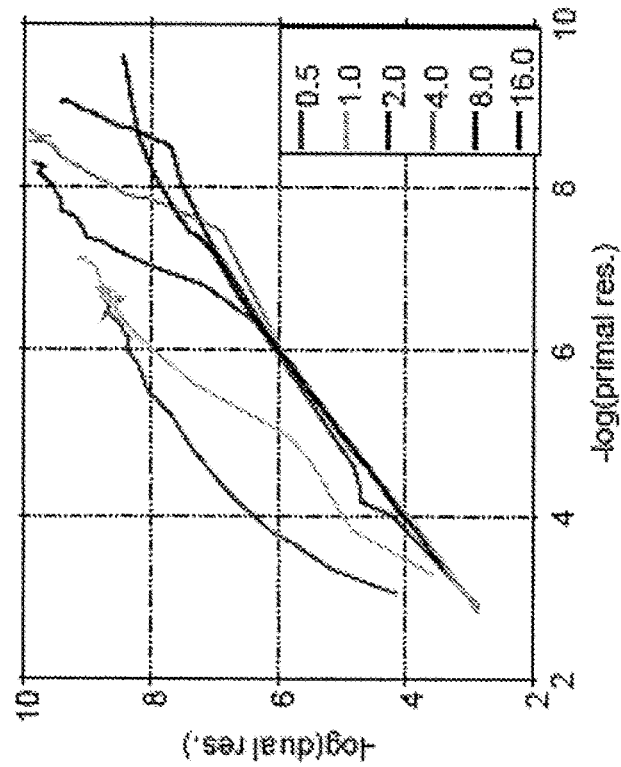
Figure 11E:
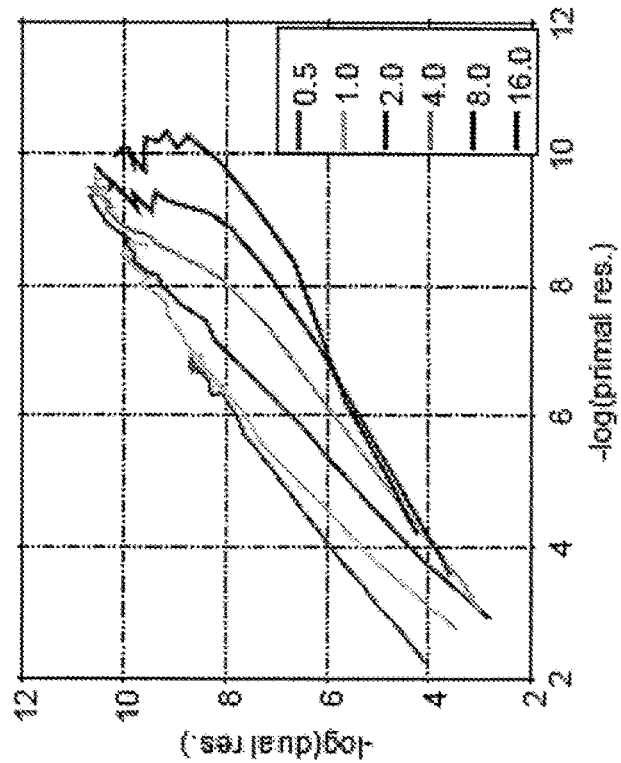
Figure 11H:
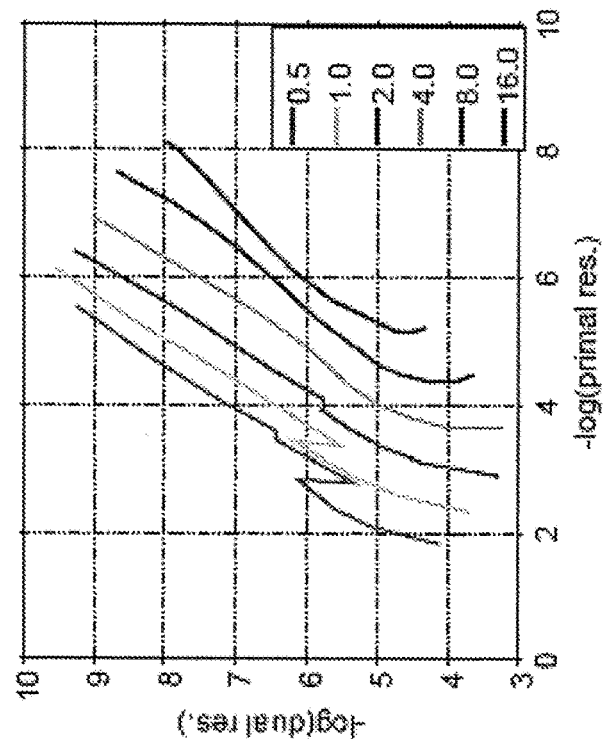
Figure 11G:
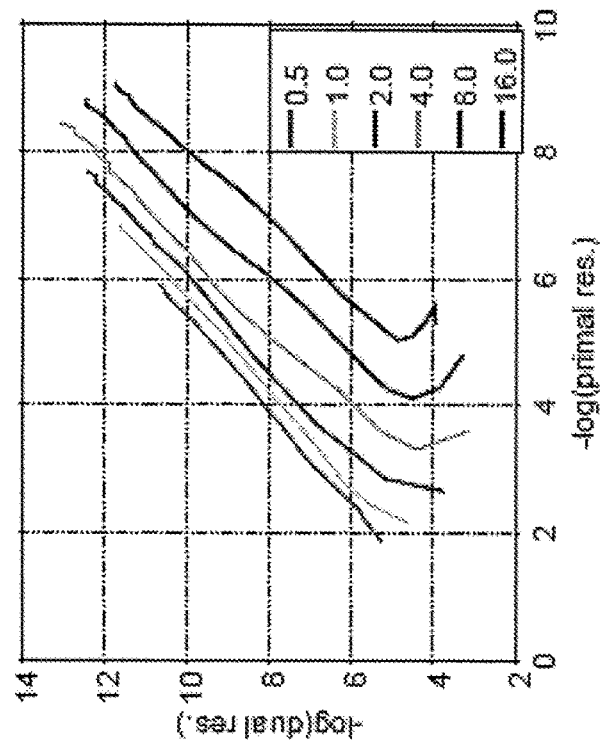
Figures 12A, 12B:
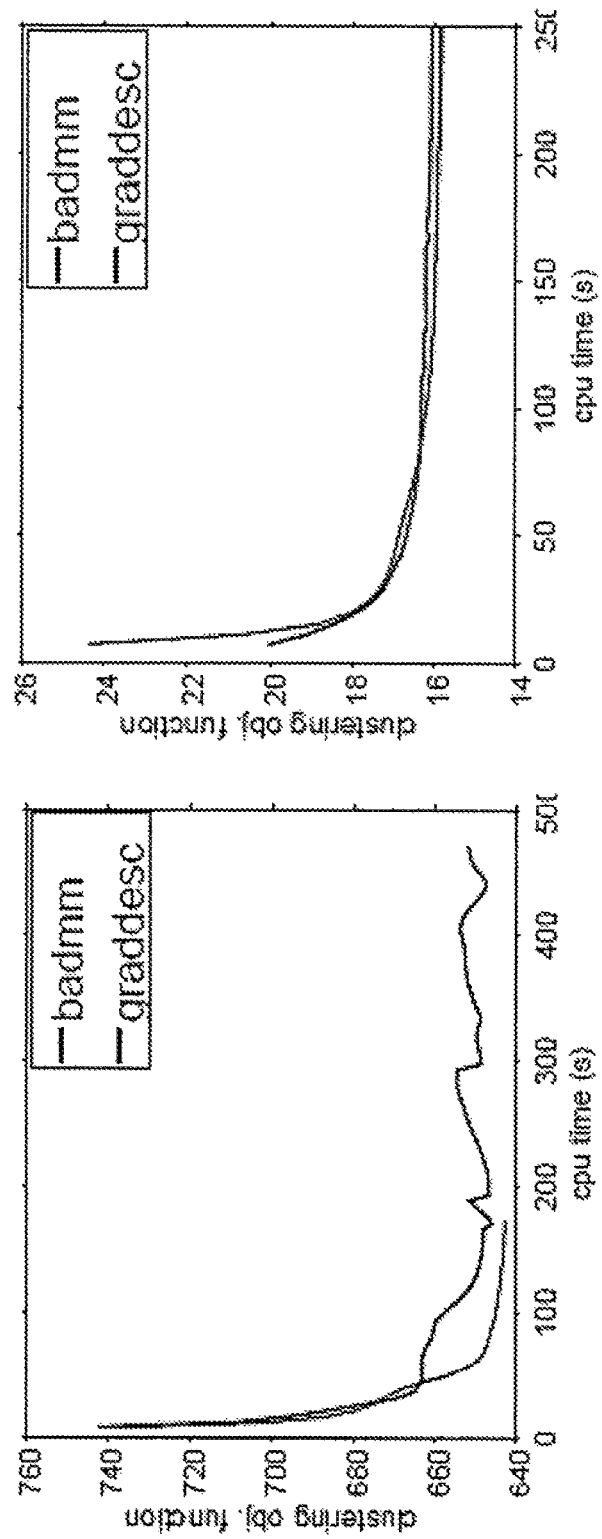
Figures 12C, 12D:
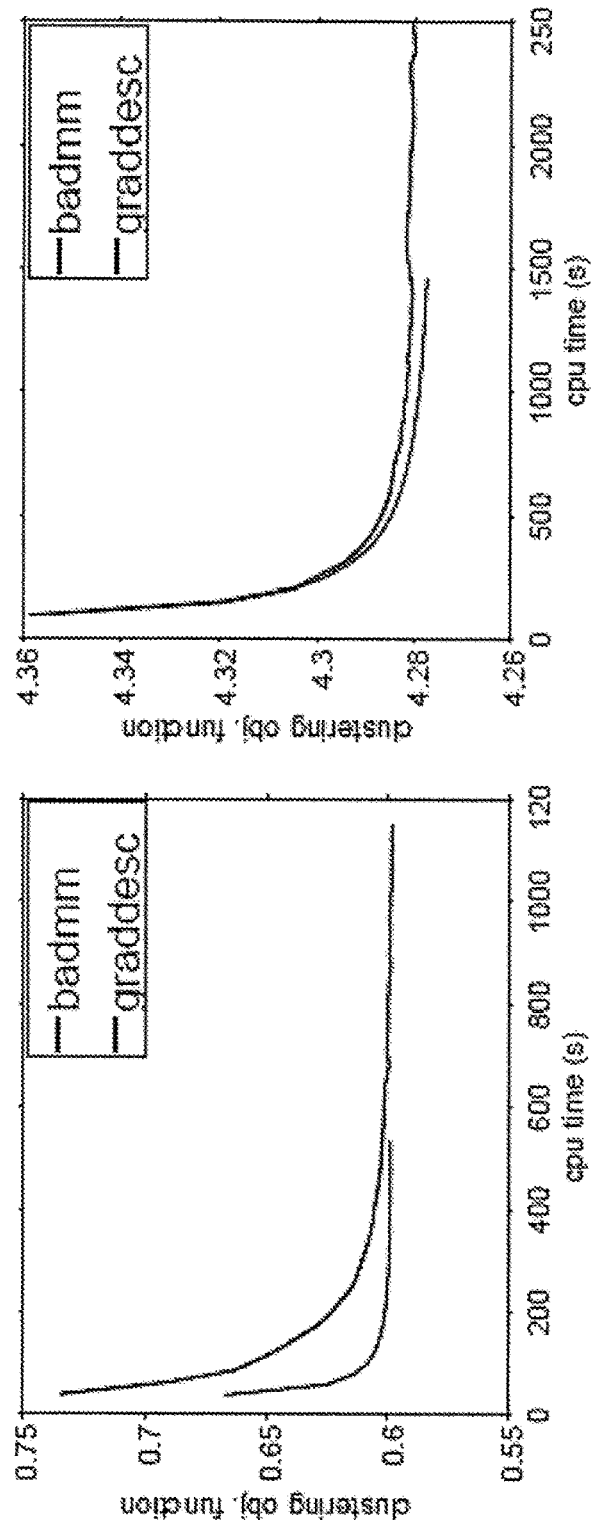

FIGS. 10B and 10C show the clustering centroids generated by parallel K-means and hierarchical K-means, running on the same dataset with identical parameters. Apparently, none of parallel K-means' or hierarchical K-means' centroids reveals distinct patterns compared with the centroids acquired by parallel D2-clustering. In order to prove the fact objectively, we compute the Davies-Bouldin index (DBI) for all the three clustering results as the measurement of their tightness. DBI is defined as $$DB = \frac{1}{k} \sum_{j=1}^{k} \max_{l \neq j} \left( \frac{\sigma_j + \sigma_l}{d(z_j, z_l)} \right), \tag{14}$$

where k is the number of clusters, $z_j$ is the centroid of cluster j, $d(z_j, z_l)$ is the distance from $z_j$ to $z_l$, and $\sigma_j$ is the average distance from $z_j$ to all the elements in cluster j. DBI is the average ratio of intra-cluster dispersion to inter-cluster dispersion. Lower DBI means a better clustering result with tighter clusters.

We compute DBI using both the squared Wasserstein distance and the squared Euclidean distance as $d(\cdot)$ in Eq. (14) for each clustering result. Table III shows the result. Parallel D2-clustering gains the lowest DBI in both cases. This indicates good tightness of the clusters generated by parallel D2-clustering. In contrast, the two implementations of K-means generate looser clusters than parallel D2-clustering. Though both can complete very fast, their clustering results are less representative.

TABLE III

Davies-Bouldin Index For Different Clustering Results

| Distance used In Eq. (14) | Parallel D2 | Parallel K-means | Hierarchical K-means |
|---|---|---|---|
| Squared Wasserstein | 1.55 | 2.99 | 2.01 |
| Squared $L_2$ | 1.69 | 5.54 | 2.04 |

Evaluation with Synthetic Data

Except for all the above experiments on real data, we also apply the algorithm on a synthetic dataset. The synthetic data are bags of weighted vectors. We carefully sample the vectors and their weights so that the data gather around several centroids, and their distances to the corresponding centroids follow the Gamma distribution, which means they follow a Gaussian distribution in a hypothetical space (Li and Wang, 2008). By using this dataset, we have some ideally distributed data with class labels.

We create a synthetic dataset containing 15 clusters, each composed of 100 samples around the centroid. The clusters are well separated. The upper bound for the number of clusters is set 20. It takes about 8 minutes to cluster the data (with 30 slave CPUs). Then 17 clusters are generated. We try to match these 17 clusters to the ground truth clusters: 9 of the 17 clusters are identical to their corresponding true clusters; 5 clusters with sizes close to 100 differ from the true clusters only by a small number of samples; 2 clusters combine precisely into one true cluster; and at last a small cluster of size 8 may have formed from some outliers. It is evident that for this synthetic dataset, the parallel D2-clustering has produced a result close to the ground truth.

Scalable Centroid Computation

Having described D2 and parallel D2-clustering, we now propose three algorithms scalable with large-scale datasets, and compare their performance in terms of speed and memory. They are (a) subgradient descent with N mini-LP, (b) standard ADMM with N mini-QP, and (c) Bregman ADMM with closed forms in each iteration of the inner loop. The bottleneck in the computation of D2-clustering is the inner loop, as detailed in Algorithm 5. The three approaches we develop here all aim at fast solutions for the inner loop, that is, to improve Algorithm 5. These new methods can reduce the computation for centroid update to a comparable (or even lower) level as the label assignment step, usually negligible in the original D2-clustering. As a result, we also take measures to speed up the labeling step, with details provided below.

---

Algorithm 5 Centroid Update with Full-batch LP

1: procedure CENTROID ($\{P^{(k)}\}_{k=1}^N$)
2:    repeat
3:       Updates $\{x_i\}$ from Eq. 17;
4:       Updates $\{w_i\}$ from solving full-batch LP (4);
5:    until P converges
6:    return P

---

Subgradient Descent Method

Eq. (18) can be casted as an input optimization model, or multi-level optimization by treating w as policies/parameters and Π as variables. Express $W^2(P, P^{(k)})$, the squared distance between P and $p^{(k)}$, as a function of w denoted by $\tilde{W}(w)^{(k)}$. $\tilde{W}(w)^{(k)}$ is the solution to a designed optimization, but has no closed form. Let $$\tilde{W}(w) = \frac{1}{N}\sum_{k=1}^{N} \tilde{W}(w)^{(k)},$$

where N is the number of instances in the cluster. Note that Eq. (18) minimizes $\tilde{W}(w)$ up to a constant multiplier. The minimization of $\tilde{W}$ with respect to w is thus a bi-level optimization problem. In the special case when the designed problem is LP and the parameters only appear on the right hand side (RHS) of the constraints or are linear in the objective, the subgradient, specifically $\nabla \tilde{W}(w)^{(k)}$ in our problem, can be solved via the same (dual) LP.

Again, we consider the routine that alternates the updates of $\{x_i\}$ and $\{\pi_{i,j}\}^{(k)}$ iteratively. With fixed $\{x_i\}$, updating $\{\pi_{i,j}\}^{(k)}$ involves solving N LP. With LP solved, we can write $\nabla \tilde{W}(w)(k)$ in closed form, which is given by the set of dual variables $\{\lambda_i^{(k)}\}_{i=1}^m$ corresponding to $\{\Sigma_{j=1}^{m^{(k)}} \pi_{i,j} = w_i, i=1, \ldots, m\}$. Because $\{w_i\}$ must reside in the facets defined by $\Omega_w = \{(w_1, \ldots, w_m) | \Sigma_{i=1}^m w_i = 1, w_i \geq 0\} \subset \mathbb{R}^m$, the projected subgradient $\nabla \tilde{W}(w)^{(k)}$ is given by $$\nabla \tilde{W}(w)^{(k)} = \left(\lambda_1^{(k)}, \ldots, \lambda_m^{(k)}\right) - \left(\sum_{i=1}^m \lambda_i^{(k)}\right)(1, \ldots, 1). \quad (15)$$

In the standard method of gradient descent, a line search is conducted in each iteration to determine the step-size for a strictly descending update. Line search however is computationally intensive for our problem because Eq. (19) requires solving a LP and we need Eq. (19) sweeping over k=1, ..., N. In machine learning algorithms, one practice to avoid expensive line search is by using a pre-determined step-size, which is allowed to vary across iterations. We adopt this approach here.

One issue resulting from a pre-determined step-size is that the updated weight vector w may have negative components. We overcome this numerical instability by the technique of re-parametrization. Let $$w_i(s) := \frac{\exp(s_i)}{\sum \exp(s_i)}, i = 1, \ldots, m. \quad (16)$$

We then compute the partial subgradient with respect to $s_i$ instead of $w_i$, and update $w_i$ by updating $s_i$. Furthermore $\exp(s_i)$ are re-scaled in each iteration such that $\Sigma_{i=1}^m s_i = 0$. The step-size $\alpha(w)$ is chosen by $$\sigma(w) := \min\left(\frac{\alpha}{\|\nabla_s \tilde{W}(w(s))\|}, \zeta\right). \quad (17)$$

The two hyper-parameters $\alpha$ and $\zeta$ trade off the convergence speed and the guaranteed decrease of the objective. Another hyper-parameter is τ which indicates the ratio between the update frequency of weights $\{w_i\}$ and that of support points $\{x_i\}$. In our experiments, we alternate one round of update for both $\{w_i\}$ and $\{x_i\}$. We summarize the subgradient descent approach in Algorithm 3.

If the support points $\{x_i\}$ are fixed, the centroid optimization is a linear programming in terms of $\{w_i\}$, thus convex. The subgradient descent method converges under mild conditions on the smoothness of the solution and small step-sizes. However, in Algorithm 6, the support points are also updated. Even the convexity of the problem is in question. Hence, the convergence of the method is not ensured. In the experiment section below, we empirically analyze the effect of the hyper-parameters on the convergence performance.

---

Algorithm 6 Centroid Update with Subgradient Descent

1: procedure CENTROID ($\{P^{(k)}\}_{k=1}^{N}$, P) ▷ with initial guess
2:    repeat
3:       Updates $\{x_i\}$ from Eq. (3) Every $\tau$ iterations;
4:       for k = 1 ... N do
5:          Obtain $\Pi^{(k)}$ and $\Lambda^{(k)}$ from LP: W(P.P$^{(k)}$)

6: 
$$\nabla \tilde{W}(w) := \frac{1}{N} \sum_{k=1}^{N} \nabla \tilde{W}(w)^{(k)}; \; \triangleright \text{See Eq. (19)}$$

7: 
$$s_i := s_i - \sigma(w)\nabla \tilde{W}(w) \cdot \frac{\partial w}{\partial s_i} \; \triangleright \text{See Eq. (21)}$$

8: 
$$s_i := s_i - \sum_{j=1}^{m} s_j, i = 1, \ldots m; \; \triangleright \text{rescaling step}$$

9: 
$$w_i := \frac{\exp(s_i)}{\Sigma \exp(s_i)}, i = 1, \ldots m; \; \triangleright \text{sum-to-one}$$

10:    until P converges
11:    return P

---

Alternating Direction Method of Multipliers

ADMM typically solves problem with two set of variables (in our case, they are $\Pi$ and w), which are only coupled in constraints, while the objective function is separable across this splitting of the two sets (in our case, w is not present in the objective function). Because problem has multiple sets of constraints including both equalities and inequalities, it is not a typical scenario to apply ADMM. We propose to relax all equality constraints $\Sigma_{j=1}^{m^{(k)}} \pi_{i,j}^{(k)} = w_i, \forall k \in \mathcal{J}^c, i \in \mathcal{J}'$ in to their corresponding augmented Lagrangians and use the other constraints to determine a convex set for the parameters being optimized. Let $\Lambda = (\lambda_{i,k}), i \in \mathcal{J}', k \in \mathcal{J}^c$. Let $\rho$ be a parameter to balance the objective function and the augmented Lagrangians. Define $\Omega_\Pi = \{(\pi_{i,j}^{(k)}): \Sigma_{i=1}^{m} \pi_{i,j}^{(k)} = w_j^{(k)}, \pi_{i,j}^{(k)} \geq 0, k \in \mathcal{J}^c, i \in \mathcal{J}', j \in \mathcal{J}_k\}$. Recall that $\Omega_w = \{(w_1, \ldots, w_m) | \Sigma_{i=1}^{m} w_i = 1, w_i \geq 0\}$. As in the method of multipliers, we form the scaled augmented Lagrangian $L_\rho(\Pi, w, \Lambda)$ as follows $$L_\rho(\Pi, w, \Lambda) = \sum_{k=1}^{N} \sum_{\substack{i \in \mathcal{J}' \\ j \in \mathcal{J}_k}} c(x_i, x_j^{(k)}) \pi_{i,j}^{(k)} + \rho \sum_{\substack{i \in \mathcal{J}' \\ k \in \mathcal{J}^c}} \lambda_{i,k} \left( \sum_{j=1}^{m^{(k)}} \pi_{i,j}^{(k)} - w_i \right) + \frac{\rho}{2} \sum_{\substack{i \in \mathcal{J}' \\ k \in \mathcal{J}^c}} \left( \sum_{j=1}^{m^{(k)}} \pi_{i,j}^{(k)} - w_i \right)^2. \tag{18}$$

Problem can be solved using ADMM iteratively as follows.

$$\Pi^{n+1} := \underset{\Pi \in \Omega_\Pi}{\operatorname{argmin}} L_\rho(\Pi, w^n, \Lambda^n), \tag{19}$$

$$w^{n+1} := \underset{w \in \Omega_w}{\operatorname{argmin}} L_\rho(\Pi^{n+1}, w, \Lambda^n), \tag{20}$$

$$\lambda_{i,k}^{n+1} := \lambda_{i,k}^{n} + \sum_{j=1}^{m^{(k)}} \pi_{i,j}^{(k),n+1} - w_i^{n+1}, i \in \mathcal{J}', k \in \mathcal{J}^c \tag{21}$$

Based on Villani, H can be updated by updating $\Pi^{(k)}$, $k=1, \ldots, N$ separately. Comparing with the full batch LP in which solves all $\Pi^{(k)}, k=1, \ldots, N$, together, ADMM solves instead N disjoint constrained quadratic programming (QP). This is the key for achieving computational complexity linear in N as well as the main motivation for employing ADMM. Specifically, we solve by solving below for each $k=1, \ldots, N$:

$$\min_{\pi_{i,j}^{(k)} \geq 0} \sum_{i=1}^{m} \sum_{j=1}^{m^{(k)}} c(x_i, x_j^{(k)}) \pi_{i,j}^{(k)} + \frac{\rho}{2} \sum_{i=1}^{m} \left( \sum_{j=1}^{m^{(k)}} \pi_{i,j}^{(k)} - w_i^n + \lambda_{i,k}^n \right)^2 \tag{22}$$

$$\text{s.t.} \sum_{i=1}^{m} \pi_{i,j}^{(k)} = w_j^{(k)}, j = 1, \ldots, m^{(k)}.$$

Since we need to solve small-size problem in multiple rounds, we prefer active set method with warm start. Define $\tilde{w}_i^{(k),n+1} := \Sigma_{j=1}^{m^{(k)}} \pi_{i,j}^{(k),n+1} + \lambda_{i,k}^n$ for $i=1, \ldots, m, k=1, \ldots, N$. We can rewrite step as $$\min_{w} \sum_{i=1}^{m} \sum_{k=1}^{N} \left( \tilde{w}_i^{(k),n+1} - w_i \right)^2 \tag{23}$$

$$\text{s.t.} \sum_{i=1}^{m} w_i = 1, w_i \geq 0, \forall i = 1, \ldots, m.$$

We summarize the computation of the centroid distribution P for distributions $P^{(k)}, k=1, \ldots, N$ in Algorithm 7. There are two hyper-parameters to choose: $\rho$ and the number of iterations $T_{admm}$. We empirically select $\rho$ proportional to the averaged transportation costs:

$$\rho = \frac{\rho_0}{Nnm} \sum_{k=1}^{N} \sum_{i \in \mathcal{J}'} \sum_{j \in \mathcal{J}_k} c(x_i, x_j^{(k)}). \tag{24}$$

---

Algorithm 7 Centroid Update with ADMM

1: procedure CENTROID ($\{P^{(k)}\}_{k=1}^{N}$, P, $\Pi$)
2:    Initialize $\Lambda^0 = \Pi^0$: $\Pi$.
3:    repeat
4:       Updates $\{x_i\}$ from Eq. (17);
5:       Reset dual coordinates $\Lambda$ to zero;
6:       for iter = 1, ..., $T_{admm}$ do
7:          for k = 1, ..., N do
8:             Update $\{\pi_{ij}\}^{(k)}$ based on QP Eq. (26);
9:             Update $\{w_i\}$ based on QP Eq. (27)
10:         Update $\Lambda$ based on Eq. (25);
11:    until P converges
12:    return P

---

Let us compare the computational efficiency of ADMM and the subgradient descent method. In the latter method, it is costly to choose an effective step-size along the descending direction because at each search point, we need to solve N LP. ADMM solves N QP subproblems instead of LP. The amount of computation in each subproblem of ADMM is thus usually higher and grows faster with the number of support points in $P^{(k)}$'s. It is not clear whether the increased complexity at each iteration of ADMM is paid off by a better convergence rate (that is, a smaller number of iterations). The computational limitation of ADMM caused by QP motivates us to explore Bregman ADMM that avoids QP in each iteration.

Bregman ADMM

Bregman ADMM replaces the quadratic augmented Lagrangians by the Bregman divergence when updating the split variables. Similar ideas trace back at least to early 1990s. We adapt the design for solving the optimal transport problem with a large set of support points. Consider two sets of variables $\Pi_{(k,1)} = (\pi_{i,j}^{(k,1)})$, $i \in \mathcal{J}$, $j \in \mathcal{J}_k$, and $\Pi_{(k,2)} = (\pi_{i,j}^{(k,2)})$, $i \in \mathcal{J}$, $j \in \mathcal{J}_k$, for $k=1, \ldots, N$ under the following constraints. Let $$\Delta_{k,1} := \left\{ \pi_{i,j}^{(k,1)} \geq 0 : \sum_{i=1}^{m} \pi_{i,j}^{(k,1)} = w_j^{(k)}, j \in \mathcal{J}_k \right\}, \quad (25)$$

$$\Delta_{k,2}(w) := \left\{ \pi_{i,j}^{(k,2)} \geq 0 : \sum_{j=1}^{m^{(k)}} \pi_{i,j}^{(k,2)} = w_i, i \in \mathcal{J}' \right\}, \quad (26)$$

then $\Pi^{(k,1)} \in \Delta_{k,1}$ and $\Pi^{(k,2)} \in \Delta_{k,2}(w)$. We introduce some extra notations:
1. $\overline{\Pi}^{(1)} = \{\Pi^{(1,1)}, \Pi^{(2,1)}, \ldots, \Pi^{(N,1)}\}$,
2. $\overline{\Pi}^{(2)} = \{\Pi^{(1,2)}, \Pi^{(2,2)}, \ldots, \Pi^{(N,2)}\}$,
3. $\overline{\Pi} = \{\overline{\Pi}^{(1)}, \overline{\Pi}^{(2)}\}$,
4. $\Lambda = \{\Lambda^{(1)}, \ldots, \Lambda^{(N)}\}$, where $\Lambda^{(k)} = (\Lambda_{i,j}^{(k)})$, $i \in \mathcal{J}'$, $j \in \mathcal{J}_k$, is a $m \times m^{(k)}$ matrix.

Bregman ADMM solves by treating the augmented Lagrangians as a conceptually designed divergence between $\Pi^{(k,1)}$ and $\Pi^{(k,2)}$, adapting to the updated variables. It restructures the original problem as $$\min_{\Pi, w} \sum_{k=1}^{N} \sum_{i \in \mathcal{J}', j \in \mathcal{J}_k} \pi_{i,j}^{(k,1)} c(x_i, x_j^{(k)}) \quad (27)$$

$$w \in \Omega_w$$

s.t. $\Pi^{(k,1)} \in \Delta_{k,1}, \Pi^{(k,2)} \in \Delta_{k,2}(w), k=1, \ldots, N$ $\Pi^{(k,1)} = \Pi^{(k,2)}, k=1, \ldots, N$.

Denote the dual variables $\Pi^{(k)} = (\Pi_{i,j}^{(k)})$, $i \in \mathcal{J}'$, $j \in \mathcal{J}_k$, for $k=1, \ldots, N$. Use $\odot$ to denote the sum of the entry-wise products of two matrices. For instance, for matrices A and B of the same dimension, $A \odot B = \text{tr}(AB')$. Use $KL(\cdot, \cdot)$ to denote the Kullback-Leibler divergence between two distributions. The Bregman ADMM algorithm adds the augmented Lagrangians for the last set of constraints in its updates, which yields the following equations.

$$\overline{\Pi}^{(1),n+1} := \operatorname*{argmin}_{\{\Pi^{(k,1)} \in \Delta_{k,1}\}} \quad (28)$$

$$\sum_{k=1}^{N} \left( \sum_{\substack{i \in \mathcal{J}' \\ j \in \mathcal{J}^c}} c(x_i, x_j^{(k)}) \pi_{i,j} + \Lambda^{(k),n} \odot \Pi^{(k,1)} + \rho KL(\Pi^{(k,1)}, \Pi^{(k,2),n}) \right),$$

$$\overline{\Pi}^{(2),n+1}, \quad (29)$$

$$w^{n+1} := \operatorname*{argmin}_{\substack{\{\Pi^{(k,2)} \in \Delta_{k,1}(w)\} \\ w \in \Omega_w}} \sum_{k=1}^{N} (-\Lambda^{(k),n} \odot \Pi^{(k,2)} + \rho KL(\Pi^{(k,2)}, \Pi^{(k,1),n+1})),$$

$$\Lambda^{n+1} := \Lambda^n + \rho(\overline{\Pi}^{(1),n+1} - \overline{\Pi}^{(2),n+1}). \quad (30)$$

We note that if w is fixed, and can be split in terms of index $k=1, \ldots, N$, and have closed form solutions for each k. For any $i \in \mathcal{J}'$, $j \in \mathcal{J}_k$, $$\tilde{\pi}_{i,j}^{(k,2),n} := \pi_{i,j}^{(k,2),n} \exp\left( \frac{-c(x_i, x_j^{(k)}) - \lambda_{i,j}^{(k),n}}{\rho} \right) \quad (31)$$

$$\pi_{i,j}^{(k,1),n+1} := \frac{\tilde{\pi}_{i,j}^{(k,2),n}}{\sum_{l=1}^{m} \tilde{\pi}_{l,j}^{(k,2),n}} w_j^{(k)} \quad (32)$$

$$\tilde{\pi}_{i,j}^{(k,1),n+1} := \pi_{i,j}^{(k,1),n+1} \exp\left( \frac{1}{\rho} \lambda_{i,j}^{(k),n} \right) \quad (33)$$

$$\pi_{i,j}^{(k,2),n+1} := \frac{\tilde{\pi}_{i,j}^{(k,1),n+1}}{\sum_{l=1}^{m^{(k)}} \tilde{\pi}_{i,l}^{(k,1),n+1}} w_i. \quad (34)$$

Since we need to update w in each iteration, it is not straightforward to solve. We consider decomposing into two stages. Observe that the minimum value of under a given w is:

$$\min_{w \in \Omega_w} \sum_{k=1}^{N} \sum_{i=1}^{m} w_i \left( \log(w_i) - \log\left( \sum_{j=1}^{m^{(k)}} \tilde{\pi}_{i,j}^{(k,1),n+1} \right) \right). \quad (35)$$

The above term (a.k.a. the consensus operator) is minimized by $$w_i^{n+1} \propto \left( \prod_{k=1}^{N} \left( \sum_{j=1}^{m^{(k)}} \tilde{\pi}_{i,j}^{(k,1),n+1} \right) \right)^{1/N}, \sum_{i=1}^{m} w_i^{n+1} = 1. \quad (36)$$

However, the above equation is a geometric mean, which is numerically unstable when $\sum_{j=1}^{m^{(k)}} \tilde{\pi}_{i,j}^{(k,1),n+1} \to 0^+$ for some pair (i,k). Similar numerical problem also arises in the alternating Bregman projection algorithm, where a regularization scheme was introduced to smooth the objective function. Here, we employ a different technique. Let $$\tilde{w}_i^{(k,1),n+1} \propto \sum_{j=1}^{m^{(k)}} \tilde{\pi}_{i,j}^{(k,1),n+1}, s.t. \sum_{i=1}^{m} \tilde{w}_i^{(k,1),n+1} = 1 \quad (37)$$

Let the distribution $\tilde{w}^{(k),n+1} = (\tilde{w}_i^{(k,1),n+1})_{i=1, \ldots, m}$. Then Eq. (40) is equivalent to $\min_{w \in \Omega_w} \sum_{k=1}^{N} KL(w, \tilde{w}^{(k),n+1})$. Essentially, a consensus w is sought to minimize the sum of KL divergence. In the same spirit, we propose to find a consensus by changing the order of w and $\tilde{w}^{(k),n+1}$ in the KL divergence: $\min_{w \in \Omega_w} Z_{k=1}^{N} KL(\tilde{w}^{(k),n+1}, w) =$ $$\min_{w \in \Omega_w} \sum_{k=1}^{N} \sum_{i=1}^{m} \tilde{w}_i^{(k,1),n+1} (\log(\tilde{w}_i^{(k,1),n+1}) - \log(w_i)), \quad (38)$$

which again has a closed form solution:

$$w_i^{n+1} \propto \frac{1}{N}\sum_{k=1}^{N} \tilde{w}_i^{(k,1),n+1}, \sum_{i=1}^{m} w_i^{n+1} = 1. \quad (39)$$

The solution of Eq. (38) overcomes the numerical instability.

We summarize the Bregman ADMM approach in Algorithm 8. The implementation involves one hyper-parameters $\rho$ (by default, $\tau=10$). In our implementation, we choose $\rho$ relatively according to Eq. 28. To the best of our knowledge, the convergence of Bregman ADMM has not been proved for our formulation (even under fixed support points x) although this topic has been pursued in a recent literature. In the general case of solving Eq. (16), the optimization of the cluster centroid is non-convex because the support points are updated after Bregman ADMM is applied to optimize the weights. We empirically test the convergence of the centroid optimization algorithm based on Bregman ADMM. We found that Bregman ADMM usually converges quickly to a moderate accuracy, making it a preferable choice for D2-clustering. In our implementation, we use a fixed number of Bregman ADMM iterations (by default, 100) across multiple assignment-update rounds in D2-clustering.

---

Algorithm 8 Centroid Update with Bregman ADMM

1:  procedure CENTROID ($\{P^{(k)}\}_{k=1}^N$, P, $\Pi$).
2:    $\Lambda := 0$; $\Pi^{(2),0} := \Pi$.
3:    repeat
4:      Update x from Eq.(17) per $\tau$ loops;
5:      for k = 1 . . . . .N do
6:        Update $\Pi^{(k,1)}$ based on Eq.(35) (36);
7:        Update $\{\tilde{\pi}_{i,j}^{k,1}\}$ based on Eq.(27);
8:      Update w based on Eq.(39);
9:      for k =1 . . . .., N do
10:       Update $\Pi^{(k,2)}$ based on Eq.(39);
11:       $\Lambda^{(k)} := \Lambda^{(k)} + \rho(\Pi^{(k,1)} - \Pi^{(k,2)})$;
12:    until P converges
13:    return P

---

Algorithm Initialization and Implementation

In this section, we explain some specifics in the implementation of the algorithms, such as initialization, warm-start in optimization, measures for further speed-up, and the method for parallelization. The number of support vectors in the centroid distribution, denoted by m, is set to the average number of support vectors in the distributions in the corresponding cluster. To initialize a centroid, we select randomly a distribution with at least m support vectors from the cluster. If the number of support vectors in the distribution is larger than m, we will merge recursively a pair of support vectors according to an optimal criterion until the support size reaches m, similar as in linkage clustering. Consider a chosen distribution $P=\{(w_1,x_1), \ldots, (w_m,x_m)\}$. We merge $x_i$ and $x_j$ to $\bar{x}=(w_i x_i + w_j x_j)/\bar{w}$, where $\bar{w}=w_i+w_j$ is the new weight for $\bar{x}$, if (i,j) solves $$\min_{i,j} \frac{w_i w_j \|x_i - x_j\|^2}{w_i + w_j}. \quad (40)$$

Let the new distribution after one merge be P'. It is sensible to minimize the Wasserstein distance between P and P' to decide which support vectors to merge. We note that $$W^2(P,P') \le w_i \|x_i - \bar{x}\|^2 + w_j \|x_j - \bar{x}\|^2.$$

This upper bound is obtained by the transport mapping $x_i$ and $x_j$ exclusively to $\bar{x}$ and the other support vectors to themselves. To simplify computation, we instead minimize the upper bound, which is achieved by the $\bar{x}$ given above and by the pair (i,j) specified in Eq. (40).

The Bregman ADMM method requires an initialization for $\Pi^{(k,2)}$, where k is the index for every cluster member, before starting the inner loops (see Algorithm 8). We use a warm-start for $\Pi^{(k,2)}$. Specifically, for the members whose cluster labels are unchanged after the most recent label assignment, $\Pi^{(k,2)}$ is initialized by its value solved (and cached) in the previous round (with respect to the outer loop). Otherwise, we initialize $\Pi^{(k,2)}=(\pi_{i,j}^{(k,2)})$ i=1, . . . , m, j=1, . . . , $m^{(k)}$ by $\pi_{i,j}^{(k,2),0}:=w_i w_j^{(k)}$. This scheme of initialization is also applied in the first round of iteration when class labels are assigned for the first time and there exists no previous solution for this parameter.

At the relabeling step (that is, to assign data points to centroids after centroids are updated), we need to compute N·K Wasserstein distances, where N is the data size and K is the number of centroids. This part of the computation, usually negligible in the original D2-clustering, is a sizable cost in our new algorithms. To further boost the scalability, we employ the technique of Elkan to skip unnecessary distance calculation by exploiting the triangle inequality of a metric.

In our implementation, we use a fixed number of iterations $\in_i$ for all inner loops for simplicity. It is not crucial to obtain highly accurate result for the inner loop because the partition will be changed by the outer loop. For Bregman ADMM, we found that setting $\in_i$ to tens or a hundred suffices. For subgradient descent and ADMM, an even smaller $\in_i$ is sufficient, e.g., around or below ten. The number of iterations of the outer loop $\in_o$ is not fixed, but adaptively determined when a certain termination criterion is met.

With an efficient serial implementation, our algorithms can be deployed to handle moderate scale data on a single PC. We also implemented their parallel versions which are scalable to a large data size and a large number of clusters. We use the commercial solver provided by Mosek, which is among the fastest LP/QP solvers available. In particular, Mosek provides optimized simplex solver for transportation problems that fits our needs well. The three algorithms we have developed here are all readily parallelizable by adopting the Allreduce framework in MPI. In our implementation, we divide data evenly into trunks and process each trunk at one processor. Each trunk of data stay at the same processor during the whole program. We can parallelize the algorithms simply by dividing the data because in the centroid update step, the computation comprises mainly separate per data point optimization problems. The main communication cost is on synchronizing the update for centroids by the inner loop. The synchronization time with equally partitioned data is negligible.

We experimented with discrete distributions over a vector space endowed with the Euclidean distance as well as over a symbolic set. In the second case, a symbol to symbol distance matrix is provided. When applying D2-clustering to such data, the step of updating the support vectors can be skipped since the set of symbols is fixed. In some datasets, the support vectors in the distributions locate only on a pre-given grid. We can save memory in the implementation by storing the indices of the grid points rather than the direct vector values.

Although we assume each instance is a single distribution in all the previous discussion, it is straightforward to generalize to the case when an instance is an array of distributions. For instance, a protein sequence can be characterized by three histograms over respectively amino acids, dipeptides, and tripeptides. This extension causes little extra work in the algorithms. When updating the cluster centroids, the distributions of different modalities can be processed separately, while in the update of cluster labels, the sum of squared Wasserstein distances for all the distributions is used as the combined distance.

Complexity and Performance Comparisons

Recall some notations: $\bar{N}$ is the data size (total number of distributions to be clustered); d is the dimension of the support vectors; K is the number of clusters; and $\in_i$ or $\in_o$ is the number of iterations in the inner or outer loop. Let m' be the average number of support vectors in each distribution in the training set and m" be the number of support vectors in each centroid distribution (m'=m" in our setup).

In a stringent memory allocation scheme, we only need to store the data and centroid distributions throughout, and dynamically allocate space for the optimization variables. The memory requirement for optimization is then negligible comparing with data. The storage of both input and output data is at the order $O(d\bar{N}m'+dKm")$. In our implementation, to cut on the time of dynamic memory allocation, we retain the memory for the matching weights between the support vectors of each distribution and its corresponding centroid. Hence, the memory allocation is of order $O(\bar{N}m'm")+O(d\bar{N}m'+dKm")$.

For computational complexity, first consider the time for assigning cluster labels in the outer loop. Without the acceleration yielded from the triangle inequality, the complexity is $O(\in_o \bar{N}Kl(m'm",d))$ where $l(m'm",d)$ is the average time to solve the Wasserstein distance between distributions on a d dimensional metric space. Empirically, we found that by omitting unnecessary distance computation via the triangle inequality, the complexity is reduced roughly to $O(\in_o (\bar{N}+K^2) (m'm",d))$. For the centroid update steps, the time complexity of the serial versions of the ADMM method is $O(\in_o\in_i\bar{N}m"d)+O(T_{admm}\cdot\in_o\in_i\bar{N}q(m'm",d))$, where $q(m'm",d)$ is the average time to solve QPs (Eq). The time complexity for the subgradient descent method is $O(\in_o\in_i\bar{N}m"d/\tau)+O(\in_o\in_i\bar{N}l(m'm",d))$. The complexity of the serial Bregman ADMM is $O(\in_o\in_i\bar{N}m"d/\tau)+O(\in_o\in_i\bar{N}m'm")$. Note that in the serial algorithms, the complexity for updating centroids does not depend on K, but only on data size $\bar{N}$. The reason is that the complexity of updating a single centroid is linear in the cluster size, which on average decreases proportionally with K at its increase. For the parallel versions of the algorithms, the communication load per iteration in the inner loop is $O(T_{admm}Km"d)$ for ADMM and $O(Km"(1+d)/\tau)$ for the subgradient descent method and Bregman ADMM.

Both analytical and empirical studies show that the ADMM algorithm is significantly slower than the other two when the data size is large due to the many constrained QP sub-problems required. Although the theoretical properties of convergence are better understood for ADMM, our experiments show that Bregman ADMM performs well consistently in terms of both convergence and the quality of the clustering results. The major drawback of the subgradient descent algorithm is the difficulty in tuning the step-size.

Although the preference for Bregman ADMM is experimentally validated, given the lack of strong theoretical results on its convergence, it is not clear-cut that Bregman ADMM can always replace the alternatives. We were thus motivated to develop the subgradient descent and standard ADMM algorithms to serve at least as yardsticks for comparison. We provide the following guidelines on the usage of the algorithms.

We recommend the modified Bregman ADMM as the default data processing pipeline for its scalability, stability, and fast performance. Large memory is assumed to be available under the default setting.

It is known that ADMM type methods can approach the optimal solution quickly at the beginning when the current solution is far from the optimum while the convergence slows down substantially when the solution is in the proximity of the optimum. Because we always reset the Lagrangian multipliers in Bregman ADMM at every inner loop and a fixed number of iterations are performed, our scheme does not pursue high accuracy for the resulting centroids in each iteration. As remarked in Boyd et al., such high accuracy is often unnecessary in machine learning applications. However, if the need arises for highly accurate centroids, we recommend the subgradient descent method that takes as initialization the centroids first obtained by Bregman ADMM.

As analyzed above, Bregman ADMM requires substantially more memory than the other two methods. Hence, on a low memory streaming platform, the subgradient descent method or the ADMM method can be more suitable. When the support size is small (say less than 10), it is also possible to speed-up the LP/QP solver greatly by doing some pre-computation, an established practice in control theory. This grants the subgradient descent and ADMM methods some extra edge.

Experiments

Our experiments comprise studies on the convergence and stability of the algorithms, computational/memory efficiency and scalability of the algorithms, and quality of the clustering results on large data from several domains.

TABLE IV

Datasets in the experiments. $\bar{N}$: data size, d: dimension of the support vectors ("symb" for symbolic data), m: number of support vectors in a centroid, K: maximum number of clusters tested. An entry with the same value as in the previous row is indicated by "—".

| Data | $\bar{N}$: | d | m: | K |
|---|---|---|---|---|
| Synthetic | 2,560,000 | ≥16 | ≥32 | 256 |
| Image color | 5,000 | 3 | 8 | 10 |
| Image texture | — | — | — | — |
| Protein sequence 1-gram | 10,742 | symb. | 20 | 10 |
| Protein sequence 3-gram | — | — | 32 | — |
| Protein sequence 1,2,3-gram | — | — | — | — |
| USPS digits | 11,000 | 2 | 80 | 360 |
| 20newsgroups GV | 18,774 | 300 | 64 | 40 |
| 20newsgroups WV | — | 400 | 100 | — |

Table IV lists the basic information about the datasets used in our experiments. For the synthetic data, the support vectors are generated by sampling from a multivariate normal distribution and then adding a heavy-tailed noise from the student's t distribution. The probabilities on the support vectors are perturbed and normalized samples from Dirichlet distribution with symmetric prior. We omit details for lack of space. The synthetic data are only used to study the scalability of the algorithms. The image color or texture data are created from crawled general-purpose photographs. Local color or texture features around each pixel in an image are clustered (aka, quantized) to yield color or texture distributions. The protein sequence data are histograms over the amino acids (1-gram), dipeptides (2-tuples of amino acids, 2-gram), and tripeptides (3-tuples, 3-gram). For the experiments herein, the protein sequences are characterized each by an array of three histograms on the 1, 2, 3-gram respectively. The USPS digit images are treated as normalized histograms over the pixel locations covered by the digits, where the support vector is the two dimensional coordinate of a pixel and the weight corresponds to pixel intensity. For the 20 newsgroups data, we use the recommended "bydate" matlab version which includes 18,774 documents and 61,188 unique words. The two datasets, "20 newsgroup GV" and "20 newsgroup WV" correspond to different ways of characterizing each document.

Convergence and Stability Analysis

We empirically test the convergence and stability of the three approaches: Bregman ADMM, ADMM, and subgradient descent method, based on their sequential versions implemented in C. Four datasets are used in the test: protein sequence 1-gram, 3-gram data, and the image color and texture data. In summary, the experiments show that the Bregman ADMM method has achieved the best numerical stability while keeping a comparable convergence rate as the subgradient descent method in terms of CPU time. Despite of its popularity in large scale machine learning problems, by lifting $\overline{N}$ LPs to $\overline{N}$ QPs, the ADMM approach is much more computationally costly on large datasets than the other two.

We first examine the convergence property of the Bregman ADMM approach for computing the centroid of a single cluster (the inner loop). In this experiment, a subset of image color or texture data with size 2000 is used. For the two protein sequence datasets, the whole sets are used. FIGS. 11A-11H show the convergence analysis results on the four datasets. The vertical axis in the plots in FIGS. 11A-11D is the objective function of Bregman ADMM, given in Eq. (18), but not the original objective function of clustering in Eq. (2). The running time is based on a single thread with 2.6 GHz Intel Core i7. The plots reveal two characteristics about the Bregman ADMM approach: 1) The algorithm achieves consistent and comparable convergence rate under a wide range of values for the hyper-parameter $\rho_0 \in \{0.5, 1.0, 2.0, 4.0, 8.0, 16.0\}$ and is numerically stable; 2) The effect of the hyper-parameter on the decreasing ratio of the dual and primal residuals follows similar patterns across the datasets.

It is technically subtle to compare the convergence and stability of the overall AD2-clustering embedded with different algorithms for computing the centroid. Because of the many iterations in the outer loop, the centroid computation algorithm (solving the inner loop) may behave quite differently over the outer-loop rounds. For instance, if an algorithm is highly sensitive to a hyper-parameter in optimization, the hyper-parameter chosen based on earlier rounds may yield slow convergence later or even cause the failure of convergence. Moreover, achieving high accuracy for centroids in earlier rounds, usually demanding more inner-loop iterations, may not necessarily result in faster decrease in the clustering objective function because the cluster assignment step also matters.

In light of this, we employ a protocol described in Algorithm 9 to decide the number of iterations in the inner loop. The protocol specifies that in each iteration of the outer loop, the inner loop for updating centroids should complete within $\eta T_\alpha / K$ amount of time, where $T_\alpha$ is the time used by the assignment step and K is the number of clusters. As we have pointed out, the LP/QP solver in the subgradient descent method or standard ADMM suffers from rapidly increasing complexity when the number of support points per distribution increases. In contrast, the effect on Bregman ADMM is much lower. In the experiment below, the datasets contain distributions with relatively small support sizes (a setup favoring the former two methods). A relatively tight time-budget $\eta=2.0$ is set. The subgradient descent method finishes at most 2 iterations in the inner loop, while Bregman ADMM on average finishes more than 60 iterations on the color and texture data, and more than 20 iterations on the protein sequence 1-gram and 3-gram data. The results by the ADMM method are omitted because it cannot finish a single iteration under this time budget.

| Algorithm 9 Algorithmic profile protocol based on a time budget |
| --- |
| 1: procedure PROFILE($\{P^{(k)}\}_{k=1}^M$, Q, K, $\eta$). |
| 2:    Start profiling: |
| 3:    T = 0: |
| 4:    repeat |
| 5:       $T_a = 0$; |
| 6:       Assignment Step: |
| 7:       GetElaspedCPUTime($T_a$, T): |
| 8:       GetAndDisplayPerplexity(T); |
| 9:       Update Step within CPU time budget $\eta T_a/K$; |
| 10:   until $T < T_{total}$ |
| 11:   return |

In FIGS. 12A-12D, we compare the convergence performance of the overall clustering process employing Bregman ADMM at $\rho_0=2.0$ and the subgradient descent method with fine-tuned values for the step-size parameter $\alpha \in \{0.05, 0.1, 0.25, 0.5, 1.0, 2.0, 5.0, 10.0\}$. The step-size is chosen as the value yielding the lowest clustering objective function in the first round. In this experiment, the whole image color and texture data are used. In the plots, the clustering objective function (Eq. (16)) is shown with respect to the CPU time. We observe a couple of advantages of the Bregman ADMM method. First, with a fixed parameter $\rho_0$, Bregman ADMM yields good convergence on all the four datasets, while the subgradient descent method requires manually tuning the step-size $\alpha$ in order to achieve comparable convergence speed. Second, Bregman ADMM achieves consistently lower values for the objective function across time. On the protein sequence 1-gram data, Bregman ADMM converges substantially faster than the subgradient descent method with a fine-tuned step-size. Moreover, the subgradient descent method is numerically less stable. Although the step-size is fine-tuned based on the performance at the beginning, on the image color data, the objective function fluctuates noticeably in later rounds. It is difficult to strike a balance (assuming it exists) between stability and speed for the subgradient descent method.

Efficiency and Scalability

We now study the computational/memory efficiency and scalability of AD2-clustering with the Bregman ADMM algorithm embedded for computing cluster centroids. We use the synthetic data that allow easy control over data size and other parameters in order to test their effects on the computational and memory load (i.e., workload) of the algorithm. We first investigate the workload on a single thread. Once we gain a good understanding about the serial workload, we can further study the scalability of our parallel implementation on a cluster computer with distributed memory. Scalability here refers to the ability of a parallel system to utilize an increasing number of processors.

TABLE V

Scaling efficiency of AD2-clustering in parallel implementation.

| | # processors | | | | |
|---|---|---|---|---|---|
| | 32 | 64 | 128 | 256 | 512 |
| SSE (%) | 93.9 | 93.4 | 92.9 | 84.8 | 84.1 |
| WSE on $\bar{N}$ (%) | 99 | 94.8 | 95.7 | 93.3 | 93.2 |
| WSE on m (%) | 96.6 | 89.4 | 83.5 | 79.0 | — |

Serial Experiments:

Given the complexity of the algorithm, it is not straightforward to quantify the relationship between workload and the data parameters (see the definitions of $\bar{N}$, K, d and m herein). To reveal the dependence of workload on any particular parameter, we fixed the other parameters at a set of representative values, and monitored memory and time consumed in one outer-loop iteration. We set $\bar{N}=5000$, K=16, d=16, m=16 as the baseline values. We run each task subject to the same parameters three times and took the median values of memory and time required. We found the following empirical trends. Both time and memory scale roughly linearly with $\bar{N}$. The effect of d upon time or memory is small when d is small (say d≤m), but larger d yields roughly linear increase in time and memory. Workload in both time and memory scale almost quadratically with m. Time scales linearly with K, while memory is affected little by K.

Parallel Experiments:

AD2-clustering can be both cpu-bound and memory-bound. Based on the observations from the above serial experiments, we conducted three sets of experiments to test the scalability of AD2-clustering in a multi-core environment, specifically, strong scaling efficiency, weak scaling efficiency with respect to $\bar{N}$ or m. The configuration ensures that each iteration finishes within one hour and the memory of a typical computer cluster is sufficient.

Strong scaling efficiency (SSE) is about the speed-up gained from using more and more processors when the problem is fixed in size. Ideally, the running time on parallel CPUs is the time on a single thread divided by the number of CPUs. In practice, such a reduction in time cannot be fully achieved due to communication between CPUs and time for synchronization. We thus measure SSE by the ratio between the ideal and the actual amount of time. We chose a moderate size problem that can fit in the memory of a single machine (50 GB): $\bar{N}=250,000$, d=16, m=64, k=16. Table V shows the SSE values with the number of processors ranging from 32 to 512. The results show that AD2-clustering scales well in SSE when the number of processors is up to hundreds.

Weak scaling efficiency (WSE) measures how stable the memory required on each processor can be when proportionally more processors are used as the size of the problem grows. We compute WSE with respect to both $\bar{N}$ and m. Let np be the number of processors. For WSE on $\bar{N}$, we set $\bar{N}=5000 \cdot np$, d=64, m=64, and K=64 on each processor. The per-node memory is roughly 1 GB. For WSE on m, we set $\bar{N}=10,000$, K=64, d=64, and $m=32 \cdot \sqrt{np}$. Table V shows the values of WSE on $\bar{N}$ and m. We can see that AD2-clustering also has good weak scalability, making it suitable for handling large scale data. In summary, our proposed method can be effectively accelerated with an increasing number of CPUs.

Quality of Clustering Results

Figure 13B:
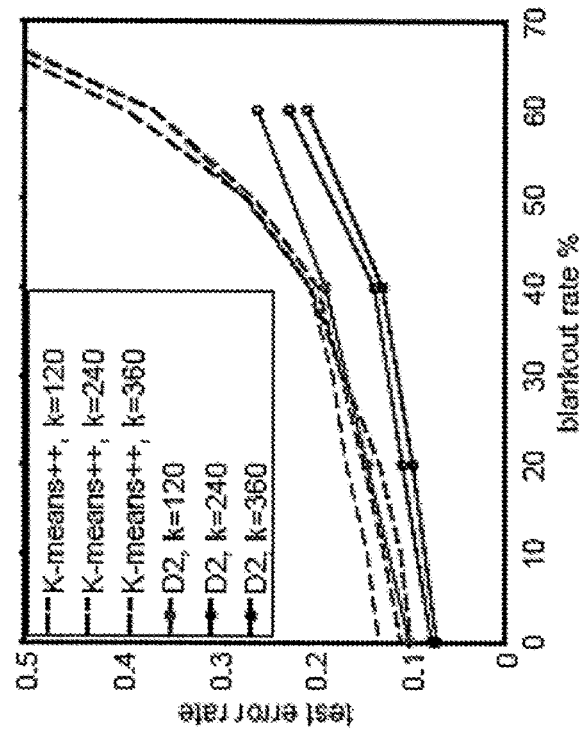
Figure 13A:
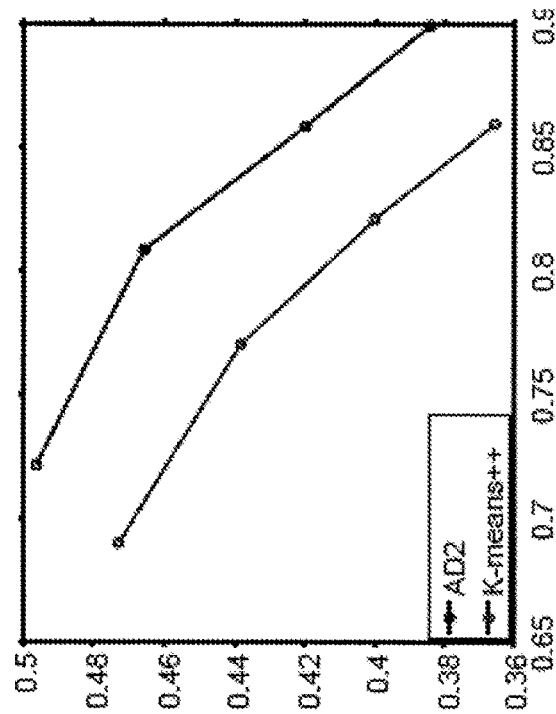

Handwritten Digits: We conducted two experiments to evaluate the results of AD2-clustering on USPS data, which contain 1100×10 instances (1100 per class). First, we cluster the images at K=30,60,120,240 and report in FIG. 13A the homogeneity versus completeness of the obtained clustering results. We set K to large values because clustering performed on such image data is often for the purpose of quantization where the number of clusters is much larger than the number of classes. In this case, homogeneity and completeness are more meaningful measures than the others used in the literature (several of which will be used later for the next two datasets). Roughly speaking, completeness measures how likely members of the same true class fall into the same cluster, while homogeneity measures how likely members of the same cluster belong to the same true class. By construction, the two measures have to be traded off. We compared our method with Kmeans++. For this dataset, we found that Kmeans++, with more careful initialization, yields better results than the standard K-means. Their difference on the other datasets is negligible. FIGS. 13A-13B show that AD2-clustering obviously outperforms Kmeans++ cross K's.

Secondly, we tested AD2-clustering for quantization with the existence of noise. In this experiment, we corrupted each sample by "blankout"-randomly deleting a percentage of pixels occupied by the digit (setting to zero the weights of the corresponding bins), as is done in Arthur and Vassilvitskii. Then each class is randomly split into 800/300 training and test samples. Clustering is performed on the 8000 training samples; and a class label is assigned to each cluster by majority vote. In the testing phase, to classify an instance, its nearest centroid is found and the class label of the corresponding cluster is assigned. The test classification error rates with respect to K and the blankout rate are plotted in FIG. 13B. The comparison with Kmeans++ demonstrates that AD2-clustering performs consistently better, and the margin is remarkable when the number of clusters is large and the blankout rate is high.

TABLE VI

The clustering is performed on 10,742 protein sequences from 3 classes using 16 cores. The ARIs given by AD2 in 10 repeating runs range in [0.224, 0.283] and [0.171, 0.179] respectively and their median values are reported.

| | Runtime (sec) | Largest | | Cluster ARI | Average Wasserstein |
|---|---|---|---|---|---|
| | | # clusters | cluster | | |
| AD2 | 175 | 6 | 3031 | 0.237 | 7.704 |
| AD2 | 220 | 10 | 2019 | 0.174 | 7.417 |
| PD2 | 1048 | 10 | 4399 | 0.202 | 8.369 |
| Spectral | 273656 | 10 | 1259 | 0.051 | — |
| CD-HIT | 295 | 654 | 824 | 0.097 | — |
| D2 (900 samples) | 1415 | 10 | — | 0.176 | 7.750 |

TABLE VII

Compare clustering results of AD2-clustering and several baseline methods usingtwo versions of Bag-of-Words representation for the 20 newsgroups data.Top panel: the data are extracted using the GV vocabulary; bottom panel:WV vocabulary. AD2-clustering is performed once on 16 cores with lessthan 5 GB memory. Run-times of AD2-clustering are reported (along with the total number of iterations).

| | If-idf | LDA | LDA Naïve | Avg. vector | AD2 | AD2 | AD2 |
|---|---|---|---|---|---|---|---|
| GV Vocab | | | | | | | |
| AMI | 0.447 | 0.326 | 0.329 | 0.360 | 0.418 | 0.461 | 0.446 |
| ARI | 0.151 | 0.160 | 0.187 | 0.198 | 0.260 | 0.281 | 0.284 |
| K | 40 | 20 | 20 | 30 | 20 | 30 | 40 |

TABLE VII-continued

Compare clustering results of AD2-clustering and several baseline methods usingtwo versions of Bag-of-Words representation for the 20 newsgroups data.Top panel: the data are extracted using the GV vocabulary; bottom panel:WV vocabulary. AD2-clustering is performed once on 16 cores with lessthan 5 GB memory. Run-times of AD2-clustering are reported (along with the total number of iterations).

|          | Tf-idf | LDA   | LDA Naïve | Avg. vector | AD2   | AD2   | AD2   |
|----------|--------|-------|-----------|-------------|-------|-------|-------|
| Hours    |        |       |           |             | 5.8   | 7.5   | 10.4  |
| # iter.  |        |       |           |             | 44    | 45    | 61    |
| WV Vocab |        |       |           |             |       |       |       |
| AMI      | 0.432  | 0.336 | 0.345     | 0.398       | 0.476 | 0.477 | 0.455 |
| ARI      | 0.146  | 0.164 | 0.183     | 0.212       | 0.289 | 0.274 | 0.278 |
| K        | 20     | 25    | 20        | 20          | 20    | 30    | 40    |
| Hours    |        |       |           |             | 10.0  | 11.3  | 17.1  |
| # iter.  |        |       |           |             | 28    | 29    | 36    |

Protein Sequences:

Composition-based methods for clustering and classification of protein or DNA sequences have been well perceived in bioinformatics. Specifically, the histogram on different compositions, e.g., nucleotides, in each sequence is used as the sequence signature. Because nucleotide or amino acid pairs or higher-order tuples are related for their molecular structures and evolutionary relationship, histograms on tuples are often incorporated in the signature as well. The "protein sequence 1, 2, 3-gram" dataset contains signatures of protein sequences, each being an array of three histograms on amino acids (1-gram), dipeptides (2-gram), and tripeptides (3-gram) respectively. There are 10,742 instances belonging to 3 classes, the largest 3 categories taken from the overlapping set of the Swiss-Prot and Prosite databases. Details on the creation of this dataset and its sources are referred to Zhang et al. (2015). Because there are 20 types of amino acids, the 1-gram histogram has fixed length 20. The dipeptides or tripeptides have a vocabulary size of $20^2$ or $20^3$. For any particular protein sequence, only its 32 most frequent 2-grams and 3-grams are kept in the histograms. The treatment of multiple distributions in one instance by D2-clustering is explained herein. This dataset is the "symbolic" type, and a symbol-to-symbol distance matrix is provided beforehand for computing the Wasserstein distance. The distance matrix is defined using the PAM250 similarity matrix of amino acid. In Zhang et al. (June 2015), several state-of-the-art clustering methods have been compared with the parallel D2-clustering algorithm (PD2) in terms of efficiency and agreement with ground-truth labels as measured by ARI. Table VII shows that our method can achieve better clustering results than PD2 using considerably less time on the same number of CPUs.

Documents as Bags of Word-Vectors:

The idea of treating each document as a bag of vectors has been explored in previous work where a nearest neighbor classifier is constructed using Wasserstein distance. But clustering based on Wasserstein distance has not been explored. We preprocessed the 20 newsgroups dataset by two steps: remove stop words; remove other words that do not belong to a pre-selected background vocabulary. In particular, two background vocabularies are tested: English Gigaword-5 (denoted by GV) and a Wikipedia dump with minimum word count of 10 (denoted by WV). Omitting details due to lack of space, we validated that under the GV or WV vocabulary information relevant to the class identities of the documents is almost intact. The words in a document are then mapped to a vector space. The document analysis community has found the mapping useful for capturing between word similarity and promoted its use. For GV vocabulary, the Glove mapping to a vector space of dimension 300 is used, while for WV, the Skip-gram model is used to train a mapping space of dimension 400. The frequencies on the words are adjusted by the popular scheme of tf-idf. The number of different words in a document is bounded by m (its value in Table IV). If a document has more than m different words, some words are merged into hyper-words recursively until reaching m, in the same manner as the greedy merging scheme used in centroid initialization are described herein.

We evaluate the clustering performance by two widely used metrics: AMI and ARI. The baseline methods for comparison include K-means on the raw tf-idf word frequencies, K-means on the LDA topic proportional vectors (the number of LDA topics is chosen from {40,60,80,100}), K-means on the average word vectors, and the naive way of treating the 20 LDA topics as clusters. For each baseline method, we tested the number of clusters $K \in \{10,15,20,25, 30,40\}$ and report only the best performance for the baseline methods in Table IV. Under any given setup of a baseline method, multiple runs were conducted with different initialization and the median value of the results was taken. The experimental results show that AD2-clustering achieves the best performance on the two datasets according to both AMI and ARI. Comparing with most baseline methods, the boost in performance by AD2-clustering is substantial. K-means on tf-idf yields AMI close to the results of AD2-clustering, but the clusters generated by the former are quite unbalanced. Unbalanced clusters tend to yield higher values in AMI due to the nature of AMI. By ARI, however, K-means on tf-idf has no advantage over the other baseline methods.

CONCLUSIONS AND FUTURE WORK

Three first-order methods for clustering discrete distributions under the Wasserstein distance have been developed and empirically compared in terms of speed, stability, and convergence. The experiments identified the modified Bregman ADMM method as most preferable for D2-clustering in an overall sense under common scenarios. The resulting clustering tool is easy to use, requiring no tuning of optimization parameters. We applied the tool to several real-world datasets, including digital images, protein sequences, and documents, and evaluated the quality of the clustering results by comparing with the ground truth class labels. Experiments show that the accelerated D2-clustering often clearly outperforms other widely used methods in the respective domain of the data.

The invention claimed is:

1. A method of clustering data objects representative of images, videos, biological processes, genetic sequences, or documents using a scalable optimization technique for scaling computational cost of the clustering to a reduced level, comprising the steps of:
   a) providing, at a computer processor including parallel processors, a set of data objects, each object being representative of an image, a video, a biological process, genetic sequence, or a document;
   b) performing an initial data segmentation on the set of data objects to divide the data into trunks before performing a discrete distribution (D2) clustering operation, wherein one of the parallel processors performs the initial data segmentation step and distributes the data trunks to each of the parallel processors;

c) performing, by all the parallel processors, a discrete distribution (D2) clustering operation, including:

i) optimizing Wasserstein centroids by using a scalable and parallel optimization technique, each data object being handled on one of the parallel processors that contains the data object, local aggregated results based on each data trunk being communicated to all of the parallel processors that uses the local aggregated results to compute the Wasserstein centroids for all the data objects, ii) assigning each data object to the nearest Wasserstein centroid, the nearest Wasserstein centroid being a label of the data object, and iii) iterating i) and ii) until a single segmentation is achieved, the number of Wasserstein centroids is reduced to a predefined number, a predefined threshold based on the distances of the data objects to the Wasserstein centroids is satisfied, the number of changed labels of objects is less than a predefined number, or the number of iterations reaches a predefined number;

wherein the scalable optimization technique is a Bregman alternating direction method of multiplier (B-ADMM) or a ADMM method or a subgradient descent method, such that the computational cost of the clustering is reduced to a level which can be handled by each of the parallel processors, the sub gradient descent method being a method that optimizes for Wasserstein centroids using subgradients in optimal transport problems solved via linear programming, the ADMM method optimizing for Wasserstein centroids using updates of ADMM by decoupling one set of constraint in optimal transport into a distributed formulation, such that a number of submodules are solved from quadratic programming, the B-ADMM approach optimizing for Wasserstein centroids using updates of B-ADMM, which is a variant of ADMM, by decoupling two sets of constraints in an optimal transport into a distributed formulation, such that a number of submodules are solved in a closed formula; and d) outputting information regarding a way in which the objects are clustered in terms of similarity.

2. The method of claim 1, wherein the objects to be clustered are mathematically represented as bags of weighted vectors.

3. The method of claim 1, wherein the objects to be clustered are mathematically represented as a histogram.

4. The method of claim 1, wherein the segmentation of the data points is based upon adjacency.

5. The method of claim 1, wherein the discrete distribution (D2) clustering operation is performed by physically separate parallel processors or separate cores of an integrated device.

* * * * *